(12) United States Patent
Li

(10) Patent No.: US 11,270,737 B2
(45) Date of Patent: Mar. 8, 2022

(54) SYSTEMS AND METHODS FOR EDITING A VIDEO

(71) Applicant: ZHEJIANG DAHUA TECHNOLOGY CO., LTD., Zhejiang (CN)

(72) Inventor: Wei Li, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 16/932,900

(22) Filed: Jul. 20, 2020

(65) Prior Publication Data

US 2020/0349974 A1 Nov. 5, 2020

Related U.S. Application Data

(63) Continuation of application No. PCT/CN2018/123774, filed on Dec. 26, 2018.

(30) Foreign Application Priority Data

Jan. 23, 2018 (CN) .................. 201810065769.X

(51) Int. Cl.
*G11B 27/031* (2006.01)
*G10L 15/18* (2013.01)
(Continued)

(52) U.S. Cl.
CPC ........ *G11B 27/031* (2013.01); *G10L 15/1815* (2013.01); *G10L 25/57* (2013.01); *G11B 27/28* (2013.01); *G11B 27/34* (2013.01)

(58) Field of Classification Search
CPC ....... G11B 27/031; G11B 27/28; G11B 27/34; G10L 15/1815; G10L 25/57;
(Continued)

(56) References Cited

U.S. PATENT DOCUMENTS 7,620,552 B2   11/2009  Rui et al.
9,251,853 B2*   2/2016  Jeong ............... G11B 27/034
(Continued)

FOREIGN PATENT DOCUMENTS

CN    1941880 A    4/2007
CN   101431689 A   5/2009
(Continued)

OTHER PUBLICATIONS

International Search Report in PCT/CN2018/123774 dated Mar. 29, 2019, 4 pages.
(Continued)

*Primary Examiner* — Loi H Tran
(74) *Attorney, Agent, or Firm* — Metis IP LLC

(57) ABSTRACT

The present disclosure relates to systems and methods for editing a video. The method may include obtaining a video document including audio information. The method may also include processing the audio information to identify at least one desired audio segment of the audio information that has at least one desired acoustic feature representation. Further, the method may include editing the video document to generate a video abstraction at least based on the identified at least one desired audio segment of the audio information.

14 Claims, 9 Drawing Sheets

(51) Int. Cl.
*G10L 25/57* (2013.01)
*G11B 27/28* (2006.01)
*G11B 27/34* (2006.01)

(58) Field of Classification Search
CPC .......... H04N 21/4394; H04N 21/8456; H04N 21/8549; H04N 21/439
USPC ....................................................... 386/241
See application file for complete search history.

(56) References Cited

U.S. PATENT DOCUMENTS

| | | | |
|---|---|---|---|
| 9,674,562 | B1 | 6/2017 | Spracklen et al. |
| 9,838,731 | B1 | 12/2017 | Matias |
| 2001/0004259 | A1* | 6/2001 | Chen ................... G06F 3/002 345/418 |
| 2006/0251385 | A1 | 11/2006 | Hwang et al. |
| 2007/0109446 | A1 | 5/2007 | Jeong et al. |
| 2007/0162924 | A1 | 7/2007 | Radhakrishnan et al. |
| 2015/0279390 | A1 | 10/2015 | Mani |
| 2016/0127697 | A1* | 5/2016 | Cho .................. G06K 9/00751 348/211.2 |
| 2016/0142794 | A1 | 5/2016 | Yoo et al. |
| 2016/0247328 | A1* | 8/2016 | Han ................... H04N 21/4394 |
| 2016/0261929 | A1 | 9/2016 | Lee et al. |
| 2017/0076155 | A1 | 3/2017 | Cho |
| 2017/0134808 | A1 | 5/2017 | Abecassis et al. |
| 2017/0230730 | A1 | 8/2017 | Casey et al. |
| 2017/0330040 | A1 | 11/2017 | Chakraborty et al. |

FOREIGN PATENT DOCUMENTS

| | | |
|---|---|---|
| CN | 101539925 A | 9/2009 |
| CN | 101650722 A | 2/2010 |
| CN | 103200463 A | 7/2013 |
| CN | 103646094 A | 3/2014 |
| CN | 104463139 A | 3/2015 |
| CN | 106878676 A | 6/2017 |
| CN | 107154264 A | 9/2017 |
| CN | 107493442 A | 12/2017 |
| WO | 2019144752 A1 | 8/2019 |

OTHER PUBLICATIONS

Written Opinion in PCT/CN2018/123774 dated Mar. 29, 2019, 6 pages.
First Office Action in Chinese Application No. 201810065769.X dated Jul. 19, 2019, 18 pages.
The Extended European Search Report in European Application No. 18902882.2 dated Aug. 31, 2020, 7 pages.

* cited by examiner

SYSTEMS AND METHODS FOR EDITING A VIDEO

CROSS-REFERENCE TO RELATED APPLICATIONS

This application is a Continuation of International Application No. PCT/CN2018/123774 filed on Dec. 26, 2018, which claims priority to Chinese Application No. 201810065769.X, filed on Jan. 23, 2018, the entire contents of each of which are hereby incorporated by reference.

TECHNICAL FIELD

The present disclosure generally relates to editing a video, and in particular, to editing a video to generate an abstraction of the video (video abstraction) at least based on audio information of the video.

BACKGROUND

A time span of a video is usually several minutes, tens of minutes, or longer. It may be time-consuming for a user to review the entire video to know the content of the video. To solve the issue, a video abstraction of the video can be generated for conveniently showing the content of the video. As used herein, the video abstraction includes a portion of the content of the video that the user is interested in. Normally, the video may include audio data and visual data. A current platform usually uses the visual data to generate the video abstraction based on an image analysis technique. Since the capacity of the visual data is relatively massive, the computation load can be large, and the time for generating the video abstraction can be relatively long. Instead, the capacity of the audio data can be much smaller than the visual data, and the audio data can also represent the content of the video. Thus, it is desirable to generate the video abstraction mainly based on the audio data, thereby reducing the computation load and/or the time for generating the video abstraction.

SUMMARY

In one aspect of the present disclosure, a system for editing a video is provided. The system may include at least one storage medium and at least one processor in communication with the at least one storage medium. The at least one storage medium may include a set of instructions. When executing the set of instructions, the at least one processor may be directed to: obtain a video document including audio information; process the audio information to identify at least one desired audio segment of the audio information that has at least one desired acoustic feature representation; and edit the video document to generate a video abstraction at least based on the identified at least one desired audio segment of the audio information.

In some embodiments, the audio information may include context information of the video document and sound information of the video document.

In some embodiments, the context information may indicate semantic context of the audio information.

In some embodiments, the sound information may include at least one of: a sound type of the sound information, a pitch of the sound information, a timbre of the sound information, or loudness of the sound information.

In some embodiments, wherein to process the audio information to identify at least one desired audio segment of the audio information that has at least one desired acoustic feature representation, the at least one processor may be directed to: divide the video document into a plurality of audio segments based on the audio information; for each of the plurality of audio segments, extract a first acoustic feature representation corresponding to the audio segment; compare the first acoustic feature representation with a reference acoustic feature representation of a reference audio; and designate the audio segment as one of the at least one desired audio segment based on a comparison result that the first acoustic feature representation corresponding to the audio segment matches the reference acoustic feature representation.

In some embodiments, wherein the at least one processor may be further directed to: obtain one or more sequential audio segments including the audio segment; extract a second acoustic feature representation corresponding to the one or more sequential audio segments; compare the second acoustic feature representation corresponding to the one or more sequential audio segments with the reference acoustic feature representation of the reference audio; and designate the one or more sequential audio segments as one of the at least one desired audio segment based on a comparison result that the second acoustic feature representation corresponding to the one or more sequential audio segments matches the reference acoustic feature representation.

In some embodiments, the reference acoustic feature representation may represent at least one of a first acoustic feature representation associated with a type of reference context information or a second acoustic feature representations associated with a reference sound type.

In some embodiments, the reference acoustic feature representation of the reference audio may be selected from a reference file, and the reference file is determined by a process, the process comprising: determining a plurality of reference audio documents including a plurality of types of reference context information and a plurality of reference sound types; extracting a reference acoustic feature representation of each of the plurality of reference audio documents; and generating the reference file based on the extracted reference acoustic feature representations.

In some embodiments, wherein the generating the reference file based on the extracted reference acoustic feature representations may include: labelling each of the plurality of reference audio documents based on the reference acoustic feature representations; and generating the reference file including the plurality of labelled reference audio documents.

In some embodiments, the process may further include: dividing the reference file into one or more sub-files based on the plurality of types of reference context information or the plurality of t reference sound types.

In some embodiments, wherein to designate the audio segment as one of the at least one desired audio segment based on a comparison result that the acoustic feature representation corresponding to the audio segment matches the reference acoustic feature representation, the at least one processor may be directed to: determine a similarity value between the acoustic feature representation and the reference acoustic feature representation of the reference audio; and designate the audio segment as one of the at least one desired audio segment in response to a determination that the similarity value between the acoustic feature representation and the reference acoustic feature representation is greater than a predetermined value.

In some embodiments, wherein to edit the video document to generate a video abstraction at least based on the identified at least one desired audio segment of the audio information, and the at least one processor may be directed to: identify one or more portions of the video document corresponding to the at least one desired audio segment respectively; and merge the one or more portions of the video document to generate the video abstraction.

In some embodiments, wherein the at least one processor may be further directed to: use the at least one desired acoustic feature representation to label the video abstraction.

In some embodiments, the video document may further include visual information, and the at least one processor may be further directed to: determine the video abstraction based on the identified at least one desired audio segment of the audio information and the visual information.

In some embodiments, wherein the at least one processor may be further directed to: use a prediction model to predict a similarity value between an acoustic feature representation of an input audio and the reference acoustic feature representation of the reference audio.

In another aspect of the present disclosure, a method for editing a video is provided. The method may be implemented on a computing device having at least one processor, at least one storage medium, and a communication platform connected to a network. The method may include obtaining a video document including audio information; processing the audio information to identify at least one desired audio segment of the audio information that has at least one desired acoustic feature representation; and editing the video document to generate a video abstraction at least based on the identified at least one desired audio segment of the audio information.

In some embodiments, the audio information may include context information of the video document and sound information of the video document.

In some embodiments, the context information may indicate semantic context of the audio information.

In some embodiments, the sound information may include at least one of: a sound type of the sound information, a pitch of the sound information, a timbre of the sound information, or loudness of the sound information.

In some embodiments, wherein the processing the audio information to identify at least one desired audio segment of the audio information that has at least one desired acoustic feature representation may include: dividing the video document into a plurality of audio segments based on the audio information; for each of the plurality of audio segments, extracting a first acoustic feature representation corresponding to the audio segment; comparing the first acoustic feature representation with a reference acoustic feature representation of a reference audio; and designating the audio segment as one of the at least one desired audio segment based on a comparison result that the first acoustic feature representation corresponding to the audio segment matches the reference acoustic feature representation.

In some embodiments, the method may also include: obtaining one or more sequential audio segments including the audio segment; extracting a second acoustic feature representation corresponding to the one or more sequential audio segments; comparing the second acoustic feature representation corresponding to the one or more sequential audio segments with the reference acoustic feature representation of the reference audio; and designating the one or more sequential audio segments as one of the at least one desired audio segment based on a comparison result that the second acoustic feature representation corresponding to the one or more sequential audio segments matches the reference acoustic feature representation.

In some embodiments, the reference acoustic feature representation may represent at least one of a first acoustic feature representation associated with a type of reference context information or a second acoustic feature representations associated with a reference sound type.

In some embodiments, the reference acoustic feature representation of the reference audio may be selected from a reference file, and the reference file is determined by a process, and the process may include: determining a plurality of reference audio documents including a plurality of types of reference context information and a plurality of reference sound types; extracting a reference acoustic feature representation of each of the plurality of reference audio documents; and generating the reference file based on the extracted reference acoustic feature representations.

In some embodiments, wherein the generating the reference file based on the extracted reference acoustic feature representations may include: labelling each of the plurality of reference audio documents based on the reference acoustic feature representations; and generating the reference file including the plurality of labelled reference audio documents.

In some embodiments, the method may also include: dividing the reference file into one or more sub-files based on the plurality of types of reference context information or the plurality of t reference sound types.

In some embodiments, wherein the designating the audio segment as one of the at least one desired audio segment based on a comparison result that the acoustic feature representation corresponding to the audio segment matches the reference acoustic feature representation may include: determining a similarity value between the acoustic feature representation and the reference acoustic feature representation of the reference audio; and designating the audio segment as one of the at least one desired audio segment in response to a determination that the similarity value between the acoustic feature representation and the reference acoustic feature representation is greater than a predetermined value.

In some embodiments, wherein the editing the video document to generate a video abstraction at least based on the identified at least one desired audio segment of the audio information may include: identifying one or more portions of the video document corresponding to the at least one desired audio segment respectively; and merging the one or more portions of the video document to generate the video abstraction.

In some embodiments, the method may include: using the at least one desired acoustic feature representation to label the video abstraction.

In some embodiments, wherein the video document may further include visual information, and the method may further include: determining the video abstraction based on the identified at least one desired audio segment of the audio information and the visual information.

In some embodiments, the method may include: using a prediction model to predict a similarity value between an acoustic feature representation of an input audio and the reference acoustic feature representation of the reference audio.

In another aspect of the present disclosure, a non-transitory computer readable medium for determining a target position of a target subject is provided. The non-transitory computer readable medium, including executable instructions that, when executed by at least one processor, may direct the at least one processor to perform a method. The method may include: obtaining a video document including audio information; processing the audio information to identify at least one desired audio segment of the audio information that has at least one desired acoustic feature representation; and editing the video document to generate a video abstraction at least based on the identified at least one desired audio segment of the audio information.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, and wherein.

DETAILED DESCRIPTION

Figure 1:
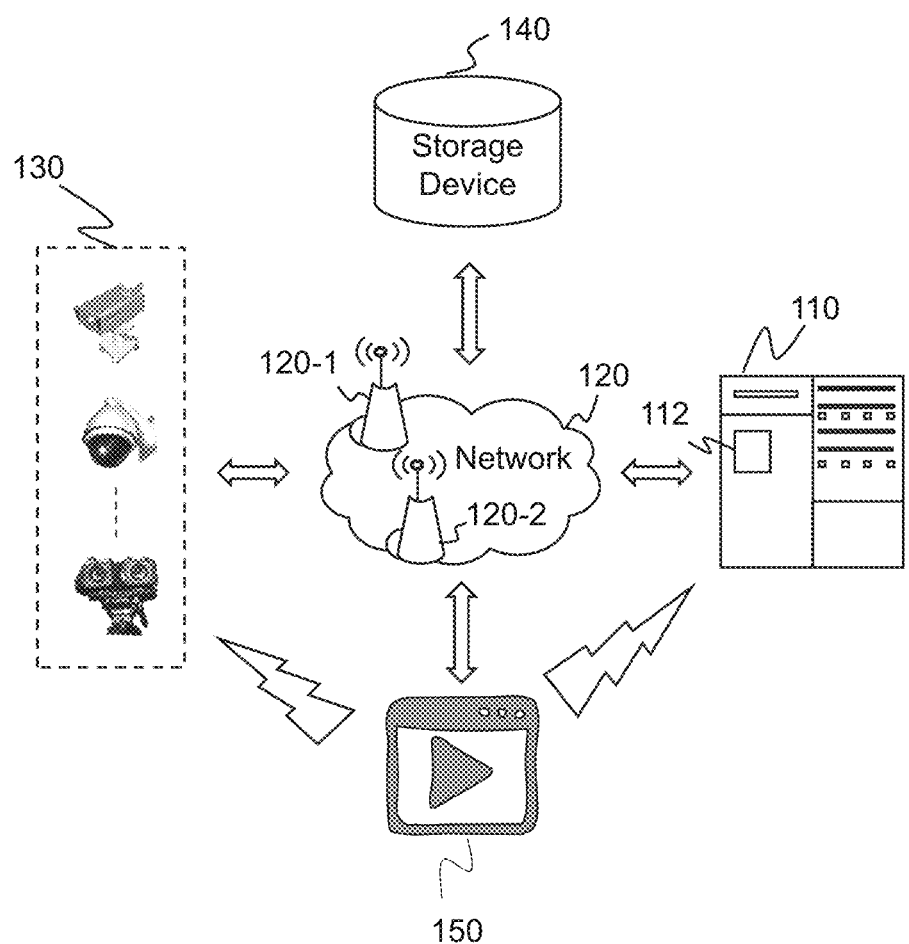
FIG. 1 is a schematic diagram illustrating an exemplary video editing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a", "an", and "the" may be intended to include the plural forms as well, unless the context clearly indicates otherwise. It will be further understood that the terms "comprise", "comprises", and/or "comprising", "include", "includes", and/or "including", when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

The modules (or units, blocks, units) described in the present disclosure may be implemented as software and/or hardware modules and may be stored in any type of non-transitory computer-readable medium or other storage device. In some embodiments, a software module may be compiled and linked into an executable program. It will be appreciated that software modules can be callable from other modules or from themselves, and/or can be invoked in response to detected events or interrupts. Software modules configured for execution on computing devices can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules (e.g., circuits) can be included of connected or coupled logic units, such as gates and flip-flops, and/or can be included of programmable units, such as programmable gate arrays or processors. The modules or computing device functionality described herein are preferably implemented as hardware modules, but can be software modules as well. In general, the modules described herein refer to logical modules that can be combined with other modules or divided into units despite their physical organization or storage.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be inconnected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

The present disclosure provides systems and methods for editing a video to generate a video abstraction of the video. The system may identify audio data of the video based on a sound recognition algorithm. Further, the system may process the audio data to identify at least one audio segment that a user of the system may be interested in. The system may generate the video abstraction based on the at least one audio segment. Specifically, the system may identify the at least one audio segment based on a reference file or a prediction model. The reference file may include reference audios and at least one reference acoustic feature representation of the reference audios that a use of the system may be interested in. At least one acoustic feature representation of the at least one audio segment may match the at least one reference acoustic feature representation. The prediction model may be configured to predict a similarity value between an acoustic feature representation of an input audio (e.g., an audio segment of the video document, an audio frame of the audio segment) and a reference acoustic feature representation of the at least one reference acoustic feature representation. It may be more quickly to generate the video abstraction by mainly using the audio data of the video than by mainly using visual data of the video.

FIG. 1 is a schematic diagram illustrating an exemplary video editing system 100 according to some embodiments of the present disclosure. The video editing system 100 may include a server 110, a network 120, a video obtaining device 130, a storage device 140, and a video document 150. The video editing system 100 may edit a video (e.g., the video document 150 of the video) to generate an abstraction of the video (also referred to as "video abstraction"). The video abstraction may include at least one desired video segment of the video that has desired audio information. The desired audio information may refer to audio information that a user (e.g., a video monitoring personnel) of the video editing system 100 desires to retrieve.

The server 110 may be a single server or a server group. The server group may be centralized, or distributed (e.g., server 110 may be a distributed system). In some embodiments, the server 110 may be local or remote. For example, the server 110 may access information and/or data stored in the video obtaining device 130, and/or the storage device 140 via the network 120. As another example, the server 110 may be directly connected to the video obtaining device 130, and/or the storage device 140 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing device 112. The processing device 112 may process information and/or data to perform one or more functions described in the present disclosure. For example, the processing device 112 may edit a video document (e.g., the video document 150) to generate a video abstraction at least based on at least one desired audio segment of the video. The desired audio segment may include audio information that a user (e.g., a video monitoring staff) of the video editing system 100 desires to retrieve. In some embodiments, the processing device 112 may include one or more processing engines (e.g., single-core processing engine(s) or multi-core processor(s)). Merely by way of example, the processing device 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components of the video editing system 100 (e.g., the server 110, the video obtaining device 130, the storage device 140) may exchange information and/or data with other component(s) of the video editing system 100 via the network 120. For example, the server 110 may obtain information and/or data (e.g., the video document 150) from the video obtaining device 130 via the network 120. In some embodiments, the network 120 may be any type of wired or wireless network, or a combination thereof. Merely by way of example, the network 130 may include a cable network, a wireline network, an optical fiber network, a telecommunications network, an intranet, the Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the video editing system 100 may be connected to the network 120 to exchange data and/or information.

The video obtaining device 130 may obtain a video and/or generate a video document 150 of the video. The video document 150 may be a document including data of a video. The data of the video may represent the content of the video in various forms. For example, the data of the video may include audio data, visual data (e.g., image data), time data, etc. In some embodiments, the video document 150 may be generated by encoding the video. The video document 150 may be an elementary stream produced by compressing analog signals (e.g., visual signals) and digital signals via an encoder. Merely by way of example, the encoder may include a Moving Picture Experts Group (MPEG) encoder, an H.261 encoder, an H.263 encoder, an Audio Video coding Standard, AVS), a Windows Medio Video encoder (WM), etc.

In some embodiments, the video may have a specific time length with a plurality of frames. The plurality of frames may be sequenced by a temporal order (e.g., from an earlier time to a later time, sequentially).

In some embodiments, the video obtaining device 130 may include a black-white camera, a color camera, an infrared camera, an X-ray camera, a Digital Video Recorder (DVR), a Network Video Recorder (NVR)), etc. In some embodiments, the video obtaining device 130 may be a smart device including or connected to a camera. The smart device may include a smart home device (e.g., a smart lighting device, a smart television,), an intelligent robot (e.g., a sweeping robot, a mopping robot, a chatting robot, an industry robot), etc. In some embodiments, videos (or video documents) obtained by a plurality of single-channel video obtaining devices 130 (e.g., cameras) may be stored in a multi-channel video obtaining device 130 (e.g., a DVR). Specifically, videos obtained by each single-channel video obtaining device 130 may be separately stored in different channels of the multi-channel video obtaining device 130. In some embodiments, the video obtaining device 130 may also classify the videos (or video documents) based on a predetermined condition. For example, the predetermined condition may be that videos with the same sound types may be stored together. As another example, the predetermined condition may be that videos with the same context information may be stored together.

In some embodiments, the video may be a video recording file obtained from the video obtaining device 130 or a video that can be previewed in real-time. The video obtaining device 130 may transmit the video document 150 to the server 110 for further processing. Additionally or alternatively, the video obtaining device 130 may transmit the video documents to the storage device 140 for further processing.

The storage device 140 may store data and/or instructions. In some embodiments, the storage device 140 may store data obtained from the video obtaining device 130. In some embodiments, the storage device 140 may store data and/or instructions that the server 110 may execute or use to perform exemplary methods described in the present disclosure. In some embodiments, the storage device 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 120 to communicate with one or more components of the video editing system 100 (e.g., the server 110, the video obtaining device 130, etc.). One or more components of the video editing system 100 may access the data or instructions stored in the storage device 140 via the network 120. In some embodiments, the storage device 140 may be directly connected to or communicate with one or more components of the video editing system 100 (e.g., the server 110, the video obtaining device 130, etc.). In some embodiments, the storage device 140 may be part of the server 110.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the storage device 140 may be a data storage including cloud computing platforms, such as, public cloud, private cloud, community, and hybrid clouds, etc. However, those variations and modifications do not depart the scope of the present disclosure.

Figure 2:
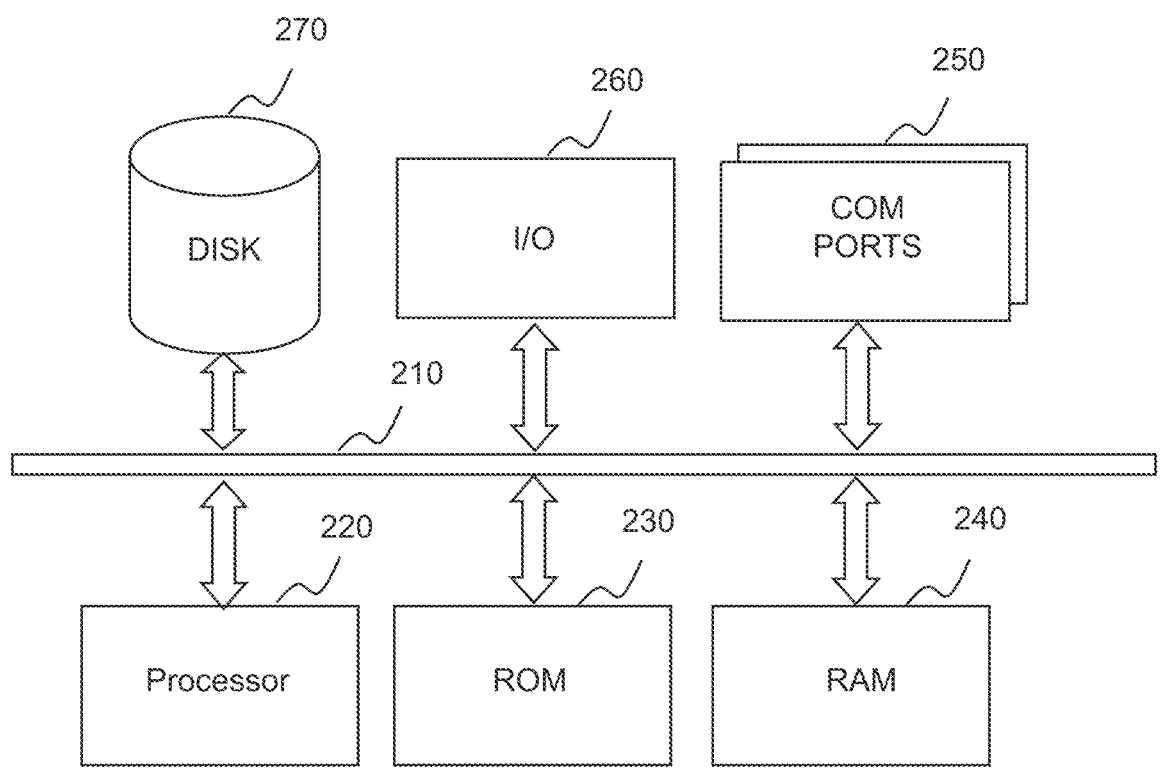
FIG. 2 is a schematic diagram illustrating exemplary hardware and/or software components of a computing device according to some embodiments of the present disclosure.

FIG. 2 is a schematic diagram illustrating exemplary hardware and/or software components of a computing device 200 according to some embodiments of the present disclosure. In some embodiments, the server 110, and/or the camera device 130 may be implemented on the computing device 200. For example, the processing device 112 may be implemented on the computing device 200 and configured to perform functions of the processing device 112 disclosed in this disclosure.

The computing device 200 may be used to implement any component of the video editing system 100 as described herein. For example, the processing device 112 may be implemented on the computing device 200, via its hardware, software program, firmware, or a combination thereof. Although only one such computer is shown, for convenience, the computer functions relating to the action recognition as described herein may be implemented in a distributed fashion on a number of similar platforms to distribute the processing load.

The computing device 200, for example, may include COM ports 250 connected to and from a network connected thereto to facilitate data communications. The computing device 200 may also include a processor 220, in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, and a read only memory (ROM) 230, or a random access memory (RAM) 240, for various data files to be processed and/or transmitted by the computing device. The exemplary computer platform may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one processor is described in FIG. 2. Multiple processors are also contemplated, thus operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
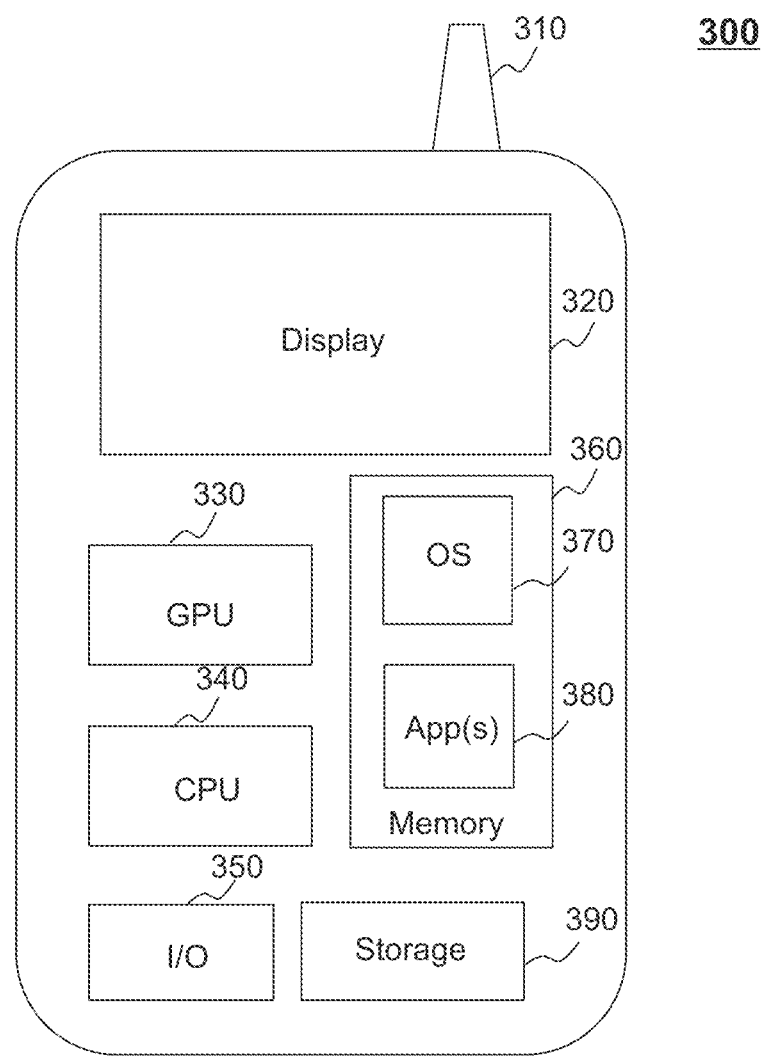
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 on which the camera device 130, or part of the camera device 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, a mobile operating system (OS) 370, and a storage 390. In some embodiments, any other suitable component, including but not limited to a system bus or a controller (not shown), may also be in the mobile device 300.

In some embodiments, the mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to action recognition or other information from the video editing system 100. User interactions with the information stream may be achieved via the I/O 350 and provided to the processing device 112 and/or other components of the video editing system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a system if appropriately programmed.

Figure 4:
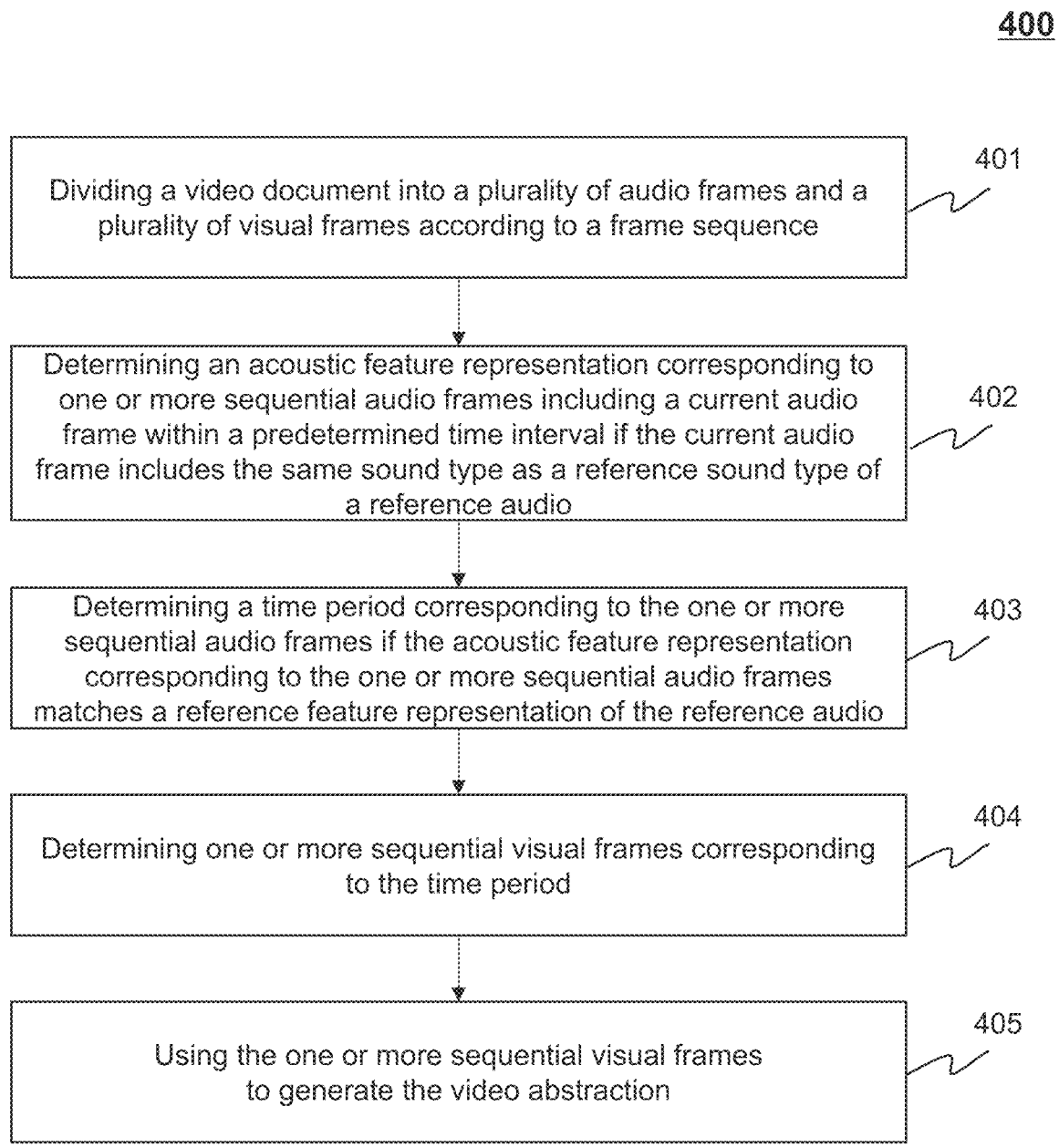
FIG. 4 is a flowchart of illustrating an exemplary process for generating a video abstraction of a video document according to some embodiments of the present disclosure.

FIG. 4 is a flowchart of illustrating an exemplary process for generating a video abstraction of a video document according to some embodiments of the present disclosure. In some embodiments, the process 400 may be implemented as a set of instructions (e.g., an application) stored in the storage ROM 230 or RAM 240. The server 110 and/or the processor 220 may execute the set of instructions, and when executing the instructions, the server 110 and/or the processor 220 may be configured to perform the process 400. The operations of the illustrated process presented below are intended to be illustrative. In some embodiments, the process 400 may be accomplished with one or more additional operations not described and/or without one or more of the operations herein discussed. Additionally, the order in which the operations of the process 400 as illustrated in FIG. 4 and described below is not intended to be limiting. In some embodiments, the process 400 may be performed by the server 110 as described below.

In 401, the server 110 may divide a video document (e.g., the video document 150) into a plurality of audio frames and a plurality of visual frames according to a frame sequence. The video document may be a document including data of a video. The data of the video may represent the content of the video. For example, the content of the video may include audio information, visual information, time information, etc. In some embodiments, the audio information may include context information, sound information of the video, etc. The context information may indicate the semantic context of the video. The sound information may include a sound type, a pitch of the sound, a timbre of the sound, loudness of the sound, or the like, or any combination thereof. In some embodiments, the visual information may include image information of the video. The image information may include a name of an object in an image, a type of an object in the image, a location of an object in the image, a size of an object in the image, a behavior of an object in the image, an action of an object in the image, or the like, or any combination thereof. In some embodiments, the time information may include the actual time when the video is obtained, a time length of the video, etc. Merely by way of example, the time length of the video may include 10 minute, 15 minutes, 30 minutes, etc. The video document may be divided into a plurality of segments (e.g., each segment may include one or more frames), and each segment may correspond to a portion of the time length. The plurality of segments (e.g., audio frames, visual frames) may be sequenced in a temporal order (e.g., from an earlier time to a later time, sequentially).

Further, each segment may be divided into a corresponding audio frame and a corresponding visual frame. Each audio frame may at least represent a portion of the audio information of the video, and each visual frame may at least represent a portion of the visual information of the video. In some embodiments, each audio frame of the video document may correspond to a visual frame of the video document. A visual frame corresponding to an audio frame may denote that the visual frame and the corresponding audio frame occur at a same time point or within a same time period in the video document. For example, the visual frame may have the same sequence number among the plurality of visual frames as the corresponding audio frame among the plurality of audio frames. Both or either of the visual frame and the corresponding audio frame may have a time label indicating the time of occurrence thereof.

In some embodiments, the video document may be generated by encoding the video using an encoder. For example, the encoder may include a Moving Picture Experts Group (MPEG) encoder, an H.261 encoder, an H.263 encoder, an Audio Video coding Standard (AVS) encoder, a Windows Medio Video (WM) encoder, etc. For illustration purpose, the video document may be an elementary stream produced by compressing analog signals (e.g., visual signals) and/or digital signals via an MPEG-2 encoder. The analog signals and/or the digital signals may be accessed from a hard disk or from network. Additionally or alternatively, the video document may be a video recording file obtained from a video channel or a video document that can be previewed in real-time. In some embodiments, the video document may be obtained from the video obtaining device 130 or the storage device 140.

In 402, the server 110 may determine whether a current audio frame includes the same sound type as a reference sound type of a reference audio. As described elsewhere in the present disclosure, the video document may include audio frames, visual frames, etc. For each frame in the video document, the server 110 may first determine whether the frame is an audio frame. In response to a determination that the frame is an audio frame, the server 110 may designate the frame as the current frame and perform the operation 402. As used herein, the reference audio may refer to an audio including a sound and corresponding context information that a user of the video editing system 100 desires to retrieve. For example, the reference audio may include a sound of fire alarm, context information of "on fire", or the like, or any combination thereof. As another example, the reference audio may include a sound of explosion, context information of "exploding", or the like, or any combination thereof.

The sound type of the current frame may be indicated by an acoustic feature representation corresponding to the current frame. As used herein, the acoustic feature representation may represent the audio information of the current frame. For example, the acoustic feature representation may represent a feature representation associated with the context information of the current frame, a feature representation associated with the sound type of the current frame, a feature representation associated with the timbre of the current frame, a feature representation associated with the loudness of the current frame, a feature representation associated with the pitch of the current frame, or the like. The acoustic feature representation of the current frame may be determined e.g., based on a sound recognition algorithm. Merely by way of example, the sound recognition algorithm may include a Dynamic Time Warping (DTW) algorithm, a Hidden Markov model, a neural network model, or the like, or any combination thereof.

In response to a determination that the current audio frame includes the same sound type as the reference sound type of the reference audio, an acoustic feature representation of one or more sequential audio frames including the current audio frame may be determined. Since a generation of a sound may be continuous, and the sound may generally last for a time length including one or more audio frames, data of the acoustic feature representations corresponding to a whole reference audio may be relatively greater than data of an acoustic feature representation corresponding to an audio frame. In order to further make sure that the audio frame actually corresponds to the reference audio, it may be necessary to determine that an acoustic feature representation of one or more sequential audio frames including the audio frame matches the reference audio, thereby improving a success rate of the match. In the present disclosure, the reference sound type may include a typical sound of a speaker, a sound of an explosion, a sound of an alarm, or a sound of a scream, or the like, or any combination thereof. It should be noted that the reference sound types may be non-limiting. Since the same sound type may also include one or more categories, it may be necessary to further determine the category of the sound in the audio frame. Merely by way of example, when the sound type is the sound of an alarm, the one or more categories may include a sound of "120" alarms, a sound of a fire alarm, etc. Thus, it may be necessary to further determine whether the category of the sound of the alarm in the audio frame is same as the category of the reference alarm of the reference audio.

In some embodiments, the one or more sequential audio frames may last for a predetermined time interval (e.g., 1 second, 10 seconds, 20 seconds). The predetermined time interval may be equal to the duration of the reference audio or greater than the duration of the reference audio.

In 403, in response to a determination that the acoustic feature representation corresponding to the one or more sequential audio frames matches a reference acoustic feature representation of the reference audio, the server 110 may determine a time period corresponding to the one or more sequential audio frames. In some embodiments, the time period may refer to the actual time period when the one or more sequential audio frames is generated. For example, the time period corresponding to the one or more sequential audio frames may be 09:40:50 a.m.-09:41:10 a.m. in the day. Additionally or alternatively, the time period may refer to a time period set by the video editing system 100 according to a specific rule based on the actual time periods. For example, if the actual time period is 09:40:50 a.m.-09:41:10 a.m., the video editing system 100 may set the time period as 0-20 seconds.

In some embodiments, the reference acoustic feature representation of the reference audio may be predetermined based on a sound recognition algorithm. A plurality of reference acoustic feature representations that a user of the video editing system 100 desires to retrieve may be predetermined. The reference acoustic feature representations may contain all types of acoustic feature representations of audio information that the user desires to retrieve. For example, the reference acoustic feature representations of the reference audios may include an acoustic feature representation of an alarm, an acoustic feature representation of a scream, an acoustic feature representation of an explosion, an acoustic feature representation of context information of "SOS", an acoustic feature representation of context information of "on fire", an acoustic feature representation of context information of "exploding", or the like, or any combination thereof. In some embodiments, the reference acoustic feature representations of the reference audios may be stored in a file, a table, a list, a database, etc. In some embodiments, a prediction model may be predetermined based on the reference acoustic feature representations of the reference audios. The prediction model may be configured to predict an acoustic feature representation of an input audio (e.g., an audio segment of the video document, an audio frame of the video segment) and at least one of the reference acoustic feature representations of the reference audios.

In 404, the server 110 may determine one or more sequential visual frames corresponding to the time period. For example, the time period corresponding to the one or more sequential audio frames may be 09:40:50 a.m.-09:41:10 in the day. Additionally or alternatively, the time period may refer to a time period set by the video editing system 100 according to a specific rule based on the actual time periods. For example, if the actual time period is 09:40:50 a.m.-09:41:10 a.m., the video editing system 100 may set the time period as 0-20 seconds. As described above, in some embodiments, each audio frame of the video document may correspond to a visual frame of the video document. In such case, the one or more sequential visual frames may correspond to the one or more sequential audio frames, respectively.

In some embodiments, an Instantaneous Decoding Refresh (IDR) frame is stored. The IDR frame may be a reference frame corresponding to a reference position (e.g., a beginning position, an ending position) of the video document. Accordingly, when the one or more sequential visual frames are determined based on the time period, it may be necessary to count from the IDR frame of the visual frames.

In 405, the server 110 may use the one or more sequential visual frames determined in 404 to generate the video abstraction of the video document.

It should be noted that operations 401 to 404 in the process 400 may be performed iteratively until all audio frames in the video document are processed. In some embodiments, the operation 401 may divide the whole video document frame by frame, and then the operation 402 may be performed. Additionally or alternatively, immediately after a portion of the video document that corresponds to a second predetermined time interval is divided according to the frame sequence, the operation 102 may be performed.

In the present disclosure, the video document may be divided into a plurality of audio frames and a plurality of visual frames according to the frame sequence. Further, a time period corresponding to the one or more sequential audio frames including the reference audio may be determined, and one or more sequential visual frames corresponding to the time period may be determined. The operations described above may be performed iteratively until all audio frames including the reference audio in the plurality of audio frames are determined. The video abstraction may be generated based on the audio frames including all the reference audios. In the present disclosure, the video abstraction may be generated by positioning the one or more sequential visual frames corresponding to the one or more sequential audio frames. Without performing an intelligent analysis (e.g., an image recognition algorithm) on the video document, the efficiency of generating the video abstraction may be improved based on the process 400.

In some embodiments, the one or more sequential audio frames may be merged into the video abstraction generated in the operation 405 in the process 400, thereby generating the video abstraction with audio information. Therefore, the operation 105 or one or more additional operations may further include merging the one or more sequential audio frames and the one or more sequential visual frames to generate the video abstraction of the video document.

Specifically, the video abstraction with audio information described in the present disclosure may be generated by the following process. After the time period corresponding to the one or more sequential audio frames is determined, a video segment corresponding to the time period may be determined. After all video segments corresponding to the one or more sequential audio frames in the video document are determined, the video segments may be merged to generate the video abstraction with audio information, thereby omitting the operation for merging the one or more sequential audio frames and the one or more sequential visual frames.

In some embodiments, the reference acoustic feature representation of the reference audio may be determined according to following processes.

In one exemplary process, a plurality of reference audios including a plurality of reference audios may be obtained. Reference acoustic feature presentations of the reference audios may be determined based on a sound recognition algorithm. The reference acoustic feature presentation may represent a feature presentation associated with a reference sound type, a feature presentation associated with the pitch of a reference audio, a feature presentation associated with the timbre of a reference audio, a feature presentation associated with the loudness of a reference audio, a feature representation of the context information corresponding to a reference audio, or the like, or any combination thereof.

Specifically, a reference audio including a reference audio may be input into e.g., the server 110. A reference acoustic feature representation of the reference audio may be identified by using the sound recognition algorithm. For illustration purpose, the sound recognition algorithm may include a Dynamic Time Warping (DTW) algorithm, a Hidden Markov model, a neural network model, or the like, or any combination thereof. In some embodiments, the sound recognition algorithm may be implemented by using an algorithm known in the art, and will not be described in detail herein.

In another exemplary process, a model related to reference audios may be determined. Reference acoustic feature presentations of the reference audio in the model may be identified by using the sound recognition algorithm. The reference acoustic feature presentation may represent a feature presentation associated with a reference sound type, a feature presentation associated with the pitch of a reference audio, a feature presentation associated with the timbre of a reference audio, a feature presentation associated with the loudness of a reference audio, a feature representation of the context information corresponding to a reference audio, or the like, or any combination thereof.

Specifically, the reference sound type(s), the pitch(es) of the reference audio, the timbre(s) of the reference audios, and/or the loudness of the reference audios may be extracted and labelled as the reference acoustic feature representations. In some embodiments, the model may also include reference context information of the reference audios. The model may be capable of determining the context information of one or more audio frames inputted into the model.

In some embodiments, the operation of determining the acoustic feature representation of the one or more sequential audio frames when the sound type of the current audio frame is same as the reference sound type (i.e., the operation 402) may include determining the one or more sequential audio frames including the current audio frame if the sound type of the current audio frame is same as at least one of the reference sound types, and determining the acoustic feature representation(s) of the one or more sequential audio frames based on the sound recognition algorithm.

Specifically, if the sound of the reference audio is a sound of alarm, and the alarm is a fire alarm, a determination of whether the current audio frame includes the sound of alarm may be performed. If the current audio frame includes the sound of alarm, an acoustic feature representation corresponding to one or more sequential audio frames within a predetermined time period may be determined. Then, a determination of whether the current audio frame includes the sound of fire alarm may be performed based on the acoustic feature representation corresponding to the one or more sequential audio frames. If the current audio frame does not include the sound of alarm, the current audio frame may be discarded. It shall be noted that sound is continuous, and in order to identify fire alarm in a more accurate way, the acoustic feature representation(s) corresponding to the one or more sequential audio frames within the predetermined time period may be determined. The one or more sequential audio frames may include at least one audio frame prior to the current audio frame and at least one sequential audio frame subsequent to the current audio frame.

In some embodiments, the operation for determining whether the acoustic feature representation of the one or more sequential audio frames matches the reference acoustic feature representation of the reference audio (e.g., the operation 403) may be performed according to a similarity value between the acoustic feature representation of the one or more sequential audio frames and the reference acoustic feature representation of the reference audio. If the similarity value between the acoustic feature representation of the one or more sequential audio frames and the reference acoustic feature representation of the reference audio is within a first predetermined range, it may be determined that the acoustic feature representation of the one or more sequential audio frames matches the reference feature representation of the reference audio (i.e., the one or more sequential audio frames includes the reference audio). Specifically, the acoustic feature representation may represent a sound type, a pitch of the sound, a timbre of the sound, loudness of the sound, context information corresponding to the sound, or the like, or any combination thereof. In some embodiments, the sound type may further include the sound category as described elsewhere in the present disclosure. It shall be noted that the similarity value may have different forms according to different scenarios.

In some embodiments, the similarity value may be denoted by the difference between the pitch of the sound corresponding to the one or more sequential audio frames and the reference pitch of the reference audio. It shall be noted that even if the context information and the sound type (or the sound category) of two different sounds (e.g., the sound corresponding to the one or more sequential audio frames and the reference audio) are the same, the pitch of them may be different. If the difference between the pitch of the sound corresponding to the one or more sequential audio frames and the reference pitch of the reference audio is within a second predetermined range, it may be determined that the acoustic feature representation of the one or more sequential audio frames matches the reference acoustic feature representation of the reference audio.

In some embodiments, the similarity value may be denoted by the difference between the timbre of the sound corresponding to the one or more sequential audio frames and the reference timbre of the reference audio. It shall be noted that even if the context information and the sound type of two different sounds (e.g., the sound corresponding to the one or more sequential audio frames and the reference audio) are the same, the timbre of them may be different. If the difference between the timbre of the sound corresponding to the one or more sequential audio frames and the reference timbre of the reference audio of the reference audio is within a third predetermined range, it is may be determined that the acoustic feature representation of the one or more sequential audio frames matches the reference acoustic feature representation of the reference audio.

The first predetermined range, the second predetermined range and/or the third predetermined range may be set by, for example, the server 110 in the present disclosure. When the similarity value between the acoustic feature representation of the one or more audio frames and the reference acoustic feature presentation of the reference audio is within the first predetermined range, the second predetermined range and/or the third predetermined range, the one or more sequential audio frames may be deemed as including the reference audio.

It shall be noted that the above similarity values are only provided for illustration purpose, and not intended to limit the scope of the present disclosure. Many alternations or modifications may be provided by a person having ordinary skills in the art according to different applications. For example, if the sound type (or the sound category) corresponding to the one or more sequential audio frames is same as the reference sound type of the reference audio, the similarity value may be related to a first difference between the pitch of the sound corresponding to the one or more sequential audio frames and the pitch of the reference pitch of the reference audio. As another example, the similarity value may be related to a second difference between the timbre of the sound corresponding to the one or more sequential audio frames and the timbre of the reference audio. As a further example, the similarity value may be related to a combination of the first difference and the second difference described above.

In some embodiments, before generating the video abstraction based on the one or more visual frames (e.g., the operation 405) in the process 400 described above, the process 400 may include storing the one or more visual frames, and merging all of the one or more visual frames and generating the video abstraction after the all of the one or more visual frames corresponding to the reference audios in the video document are determined.

Specifically, since the number of audio frames including the reference audio may be very large, the corresponding visual frames may also be very large. To facilitate the merging process, each of the corresponding visual frames, immediately after being determined according to the time period, may be stored in a storage device, e.g., the storage device 140. Therefore, after all the corresponding visual frames corresponding to the reference audios in the video document are determined, all the corresponding visual frames may be directly merged in the storage device to generate the video abstraction.

In some embodiments, before generating the video abstraction based on the one or more visual frames (e.g., the operation 405) in the process 400 described above, the process 400 may include storing the time periods of all the one or more visual frames, and generating the video abstraction after all the one or more visual frames corresponding to the reference audios in the video document are determined.

Further, in order to reduce the storage space occupied by the video frames in, e.g., the server 110, the time periods of the visual frames (corresponding to the one or more audio frames including the reference audio), instead of the visual frames, may be stored in the storage device (e.g., the storage device 140). Then, all the visual frames corresponding to the stored time periods may be merged to generate the video document.

As described in connection with FIG. 1, videos (or video documents) may be separately stored in different channels of the multi-channel video obtaining device 130. The video obtaining device 130 may also classify the videos (or video documents) based on a predetermined condition. For example, the predetermined condition may be that videos with the same sound type may be stored together. As another example, the predetermined condition may be that videos with the same context information may be stored together. Accordingly, the operation for determining the time period (e.g., the operation 403) may also include determining a channel or a classification of the one or more audio frames. After the video abstraction is generated, the video abstraction may be stored with respect to the corresponding channel and/or classification.

Specifically, video documents may be obtained from a multi-channel video obtaining device 150, and one of one or more audio frames including reference audios in different video documents may be generated in a same time period. In order to facilitate both the video abstraction process and the search of the video abstraction in the same time period, the channel corresponding to the video abstraction may be determined and the video abstraction may be stored according to its channel. As described above, the videos (or video documents) may be classified by the predetermined condition. In order to facilitate the search of the video abstraction with a specific classification, videos and corresponding video abstractions with the same classification may be stored together. A user may further search the videos and/or the corresponding video abstractions based on the classifications and the channels.

In some embodiments, after the operation (e.g., the operation 401) for dividing the video document into the plurality of audio frames and the plurality of visual frames according to the frame sequence and before the operation (e.g., operation 402) for determining the sound type of the current audio frame, the process 400 may include decoding the audio frames. Specifically, the audio frames may need to be decoded into original Pulse Code Modulation (PCM) data.

Figure 5:
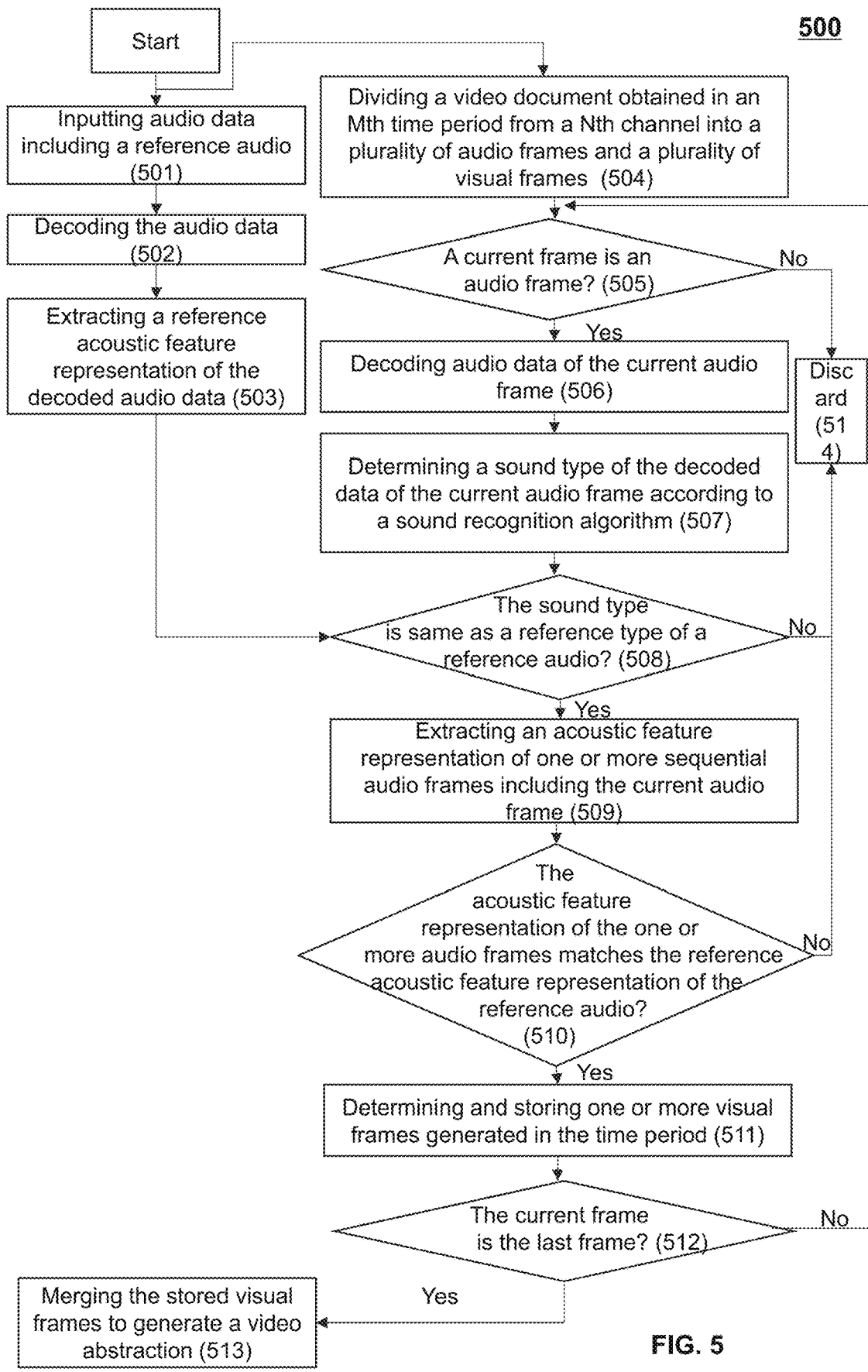
FIG. 5 is a flowchart illustrating an exemplary process for generating a video abstraction of a video document according to some embodiments of the present disclosure.

FIG. 5 is a flowchart illustrating an exemplary process for generating a video abstraction of a video document according to some embodiments of the present disclosure. In some embodiments, the process 500 may be implemented as a set of instructions (e.g., an application) stored in the storage ROM 230 or RAM 240. The server 110 and/or the processor 220 may execute the set of instructions, and when executing the instructions, the server 110 may be configured to perform the process 500. The operations of the illustrated process presented below are intended to be illustrative. In some embodiments, the process 500 may be accomplished with one or more additional operations not described and/or without one or more of the operations herein discussed. Additionally, the order in which the operations of the process 500 as illustrated in FIG. 5 and described below is not intended to be limiting. In some embodiments, the process 500 may be performed by the server 110 as described above.

As shown in FIG. 5, in 501, audio data including a reference audio may be input into, the server 110. The audio data may be obtained from the video obtaining device 130 or the storage device 140. The audio data may represent the content of the audio.

In 502, the server 110 may decode the audio data. As described in connection with FIG. 4, the server 110 may decode the audio data by a decoder. An exemplary decoder may include a Moving Picture Experts Group (MPEG) decoder, an H.261 decoder, an H.263 decoder, an Audio Video coding Standard, AVS) decoder, a Windows Medio Video decoder (WMV), etc.

In 503, the server 110 may extract an acoustic feature representation of the decoded audio data based on a sound recognition algorithm. As described in connection with FIG. 4, the acoustic feature representation may represent a feature representation of context information and/or sound information of the audio data. The sound recognition algorithm may include a Dynamic Time Warping (DTW) algorithm, a Hidden Markov model, a neural network model, or the like, or any combination thereof.

In 504, the server 110 may divide a video document into a plurality of audio frames and a plurality of visual frames. The video document may be obtained by the video obtaining device 130 or from the storage device 140. As described in FIG. 1 and FIG. 4, videos (or video documents) obtained by a plurality of single-channel video obtaining devices (e.g., cameras) may be stored in a multi-channel video obtaining device (e.g., a DVR). Specifically, videos obtained by each single-channel video obtaining device may be separately stored in one channel of the multi-channel video obtaining device. The video document obtained in 504 may be a video document obtained in an Mth time period obtained from an Nth channel.

In 505, the server 110 may determine whether a current frame is an audio frame. In response to a determination that the current frame is an audio frame, the process 500 may perform operation 506. In response to a determination that the current frame is not an audio frame, the process 500 may perform operation 514 to discard the current frame and retrieve another frame as a new current frame.

In 506, the server 110 may decode audio data of the current audio frame. As described in connection with FIG. 4, the audio data may be decoded by a decoder. An exemplary decoder may include a Moving Picture Experts Group (MPEG) decoder, an H.261 decoder, an H.263 decoder, an Audio Video coding Standard, AVS) decoder, a Windows Medio Video decoder (WMV), etc.

In 507, the server 110 may determine a sound type of the decoded audio data of the current audio frame according to a sound recognition algorithm. Specifically, an acoustic feature representation associated with the sound type of the decoded audio data may be identified based on the sound recognition algorithm. The acoustic feature representation associated with the sound type of the decoded audio data may include a feature representation of context information and/or sound information of the decoded audio data.

In 508, the server 110 may determine whether the sound type of the current audio frame is same as a reference type of a reference audio according to a comparison between the sound type of the decoded audio data of the current audio frame generated in 507 and the reference acoustic feature representation of the decoded audio data generated in 503. As used herein, decoded audio data corresponding to the reference audio may be included in the decoded audio data generated in 503. In response to a determination that the sound type of the current audio frame is same as the reference type of the reference audio, the process 500 may perform operation 509. In response to a determination that the sound type of the current audio frame is different from the reference type of the reference audio, the process 500 may discard the current audio frame.

In 509, the server 110 may extract an acoustic feature representation of one or more sequential audio frames including the current audio frame. The one or more sequential audio frames may last for a predetermined time length.

In 510, the server 110 may determine whether the acoustic feature representation of the one or more audio frames matches the reference acoustic feature representation of the reference audio (i.e., the audio data obtained in 501) according to a comparison between the acoustic feature representation of the one or more audio frames extracted in 509 and the reference acoustic feature representation of the decoded audio data of the reference audio generated in 503. If the acoustic feature representation of the one or more audio frames matches the reference acoustic feature representation of the reference audio, the process 500 may perform operation 2011. If the acoustic feature representation of the one or more audio frames does not match the reference acoustic feature representation of the reference audio, the process 500 may discard the current audio frame.

In 511, the server 110 may determine one or more visual frames generated in the same time period as the one or more audio frames and store in, e.g., the storage device 140.

In 512, the server 110 may judge whether the current frame is the last frame. If the current frame is the last frame, the process for perform operation 513. If the current frame is not the last frame, the process 500 may return back to the operation 505.

In 513, the server 110 may merge the stored visual frames to generate the video abstraction. More detailed descriptions of generating the video abstraction can be found elsewhere in the present disclosure, e.g., in FIG. 4 and the description thereof.

Figure 6:
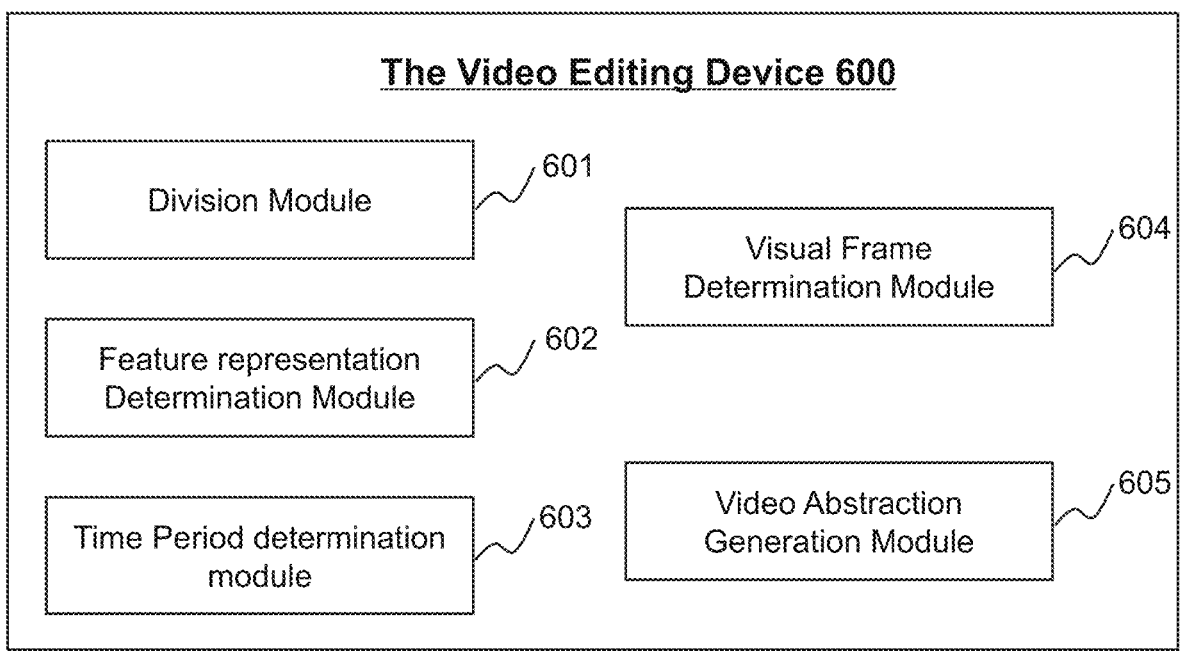
FIG. 6 is a block diagram illustrating an exemplary video editing device according to some embodiments of the present disclosure.

FIG. 6 is a block diagram illustrating an exemplary video editing device according to some embodiments of the present disclosure. The video editing device 600 may include a division module 601, a feature representation determination module 602, a time period determination module 603, a visual frame determination module 604, and a video abstraction generation module 605.

The division module 601 may be configured to separate a video document (e.g., the video document) into a plurality of audio frames and a plurality of visual frames according to a frame sequence. As described in FIG. 4, the video document may be a document including data of a video. The data of the video may represent the content of the video. For example, the content of the video may include audio information, visual information, time information, etc. In some embodiments, the audio information may include context information, sound information of the video, etc. The context information may indicate the semantic context of the video. The sound information may include a sound type, a pitch of the sound, a timbre of the sound, loudness of the sound, or the like, or any combination thereof. In some embodiments, the visual information may include image information of the video. The image information may include a name of an object in an image, a type of an object in the image, a location of an object in the image, a size of an object in the image, a behavior of an object in the image, an action of an object in the image, or the like, or any combination thereof. In some embodiments, the time information may include the actual time when the video is obtained, a time length of the video, etc. Merely by way of example, the time length of the video may include 10 minute, 15 minutes, 30 minutes.

In some embodiments, the separation module 601 may also be configured to divide the video document into a plurality of segments (e.g., each segment may include one or more frames), and each segments may correspond to a portion of the time length. The plurality of segments (e.g., audio frames, visual frames) may be sequenced in a temporal order (e.g., from an earlier time to a later time, sequentially).

Further, each segment may be divided into a corresponding audio frame and a corresponding visual frame. Each audio frame may at least represent a portion of the audio information of the video, and each visual frame may at least represent a portion of the visual information of the video. In some embodiments, each audio frame of the video document may correspond to a visual frame of the video document. A visual frame corresponding to an audio frame may denote that the visual frame and the corresponding audio frame occur at a same time point or within a same time period in the video document.

For each audio frame, the feature representation determination module 602 may be configured to determine an acoustic feature representation of one or more sequential audio frames including a current audio frame if the current audio frame includes a same sound type as the reference sound type of the reference audio. As used herein, the reference audio may refer to an audio including a sound and corresponding context information that a user of the video editing system 100 desires to retrieve. For example, the reference audio may include a sound of fire alarm, context information of "on fire", or the like, or any combination thereof. As another example, the reference audio may include a sound of explosion, context information of "exploding", or the like, or any combination thereof.

The time period determination module 603 may be configured to determine a time period corresponding to the one or more sequential audio frames if the acoustic feature representation corresponding to the one or more sequential audio frames matches the reference acoustic feature representation of the reference audio. In some embodiments, the time period may refer to the actual time when the one or more sequential audio frames is generated. For example, the time period corresponding to the one or more sequential audio frames may be 09:40:50 a.m.-09:41:10 a.m. in the day. Additionally or alternatively, the time period may refer to a time period set by the video editing system 100 according to a specific rule based on the actual time periods. For example, if the actual time period is 09:40:50 a.m.-09:41:10 a.m., the video editing system 100 may set the time period as 0-20 seconds.

The visual frame determination module 604 may be configured to determine one or more sequential visual frames corresponding to the time period. For example, the time period corresponding to the one or more sequential audio frames may be 09:40:50 a.m.-09:41:10 in the day. Additionally or alternatively, the time period may refer to a time period set by the video editing system 100 according to a specific rule based on the actual time periods. For example, if the actual time period is 09:40:50 a.m.-09:41:10 a.m., the video editing system 100 may set the time period as 0-20 seconds.

The video abstraction generation module 605 may be configured to use the one or more sequential visual frames to generate the video abstraction of the video document.

Additionally or alternatively, the video abstraction generation module 605 may be configured to merge the one or more audio frames and the one or more visual frames to generate the video abstraction.

In some embodiments, the reference acoustic feature representation of the reference audio may be determined according to following processes.

Reference acoustic feature presentations of the reference audios may be determined based on a sound recognition algorithm. The reference acoustic feature presentations may include a feature presentation associated with a reference sound type, a feature presentation associated with the pitch of a reference audio, a feature presentation associated with the timbre of a reference audio, a feature presentation associated with the loudness of a reference audio, a feature representation of the context information corresponding to a reference audio, or the like, or any combination thereof.

In another exemplary process, a model related to reference audios may be determined. Reference acoustic feature presentations of the reference audios in the model may be identified by using the sound recognition algorithm. The reference acoustic feature presentations may include a feature presentation associated with a reference sound type, a feature presentation associated with the pitch of a reference audio, a feature presentation associated with the timbre of a reference audio, a feature presentation associated with the loudness of a reference audio, a feature representation of the context information corresponding to a reference audio, or the like, or any combination thereof.

Specifically, the feature represent determination module 602 may be configured to determine the one or more sequential audio frames including the current audio frame if the sound type of the current audio frame is same as at least one of the reference sound types, and determining the acoustic feature representation(s) of the one or more sequential audio frames based on the sound recognition algorithm.

Specifically, the time period determination module 603 may be configured to determine that the acoustic feature representation of the one or more sequential audio frames matches the reference feature representation of the reference audio if a similarity value between the acoustic feature representation of the one or more sequential audio frames and the reference acoustic feature representation of the reference audio is within a predetermined range.

Alternatively, the video abstraction generation module 35 may also be configured to store the one or more visual frames, and merge all of the one or more visual frames and generating the video abstraction after the all of the one or more visual frames corresponding to the reference audios in the video document are determined.

The video abstraction generation module 605 may be configured to store the time periods of all the one or more visual frames, and generate the video abstraction after all the one or more visual frames corresponding to the reference audios in the video document are determined.

The video abstraction generation module 605 may also be configured to determine a channel or a classification of the one or more audio frames. After the video abstraction is generated, the video abstraction generation module 605 may store the video abstraction based on the channel and/or classification.

Additional or alternatively, the video editing device 600 may also include a decoding module (not shown in FIG. 6). The decoding module may be configured to decode audio frames after the video document into the plurality of audio frames and the plurality of visual frames are divided according to the frame sequence and before the determination that the sound type of the current audio frame is same as the reference type of the reference audio.

In the process for generating a video abstraction described above, a video document (e.g., the video document 150) may be divided into a plurality of audio frames and a plurality of visual frames according to a frame sequence. For each audio frame, if the current audio frame includes a same sound type as the reference sound type of the reference audio, an acoustic feature representation corresponding to one or more sequential audio frames including the current audio frame may be determined. If the acoustic feature representation corresponding to the one or more sequential audio frames matches the reference acoustic feature representation of the reference audio, a time period corresponding to the one or more sequential audio frames may be determined. One or more sequential visual frames corresponding to the time period may be determined and used to generate the video abstraction of the video document.

The modules in the video editing device 600 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the video editing device 600 may include a storage module (not shown) which may be used to store data generated by the above-mentioned modules.

Figure 7:
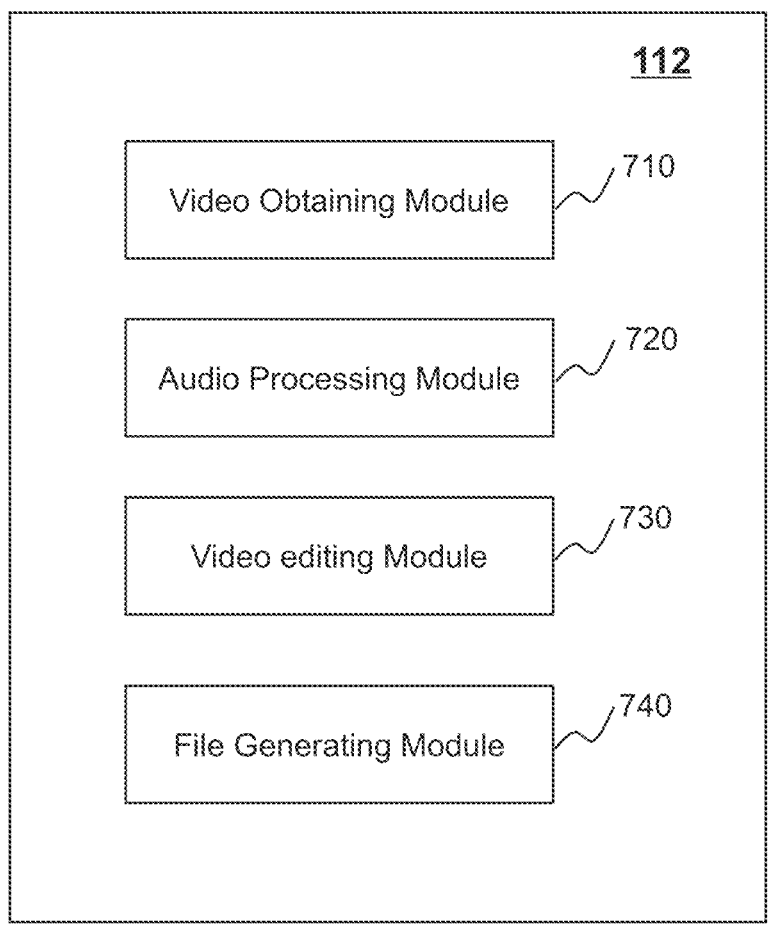
FIG. 7 is a block diagram illustrating an exemplary processing device according to some embodiments of the present disclosure.

FIG. 7 is a block diagram illustrating an exemplary processing device according to some embodiments of the present disclosure. The processing device 112 may include a video obtaining module 710, an audio processing module 720, a video editing module 730, and a file generating module 740.

The video obtaining module 710 may be configured to obtain a video document (e.g., the video document 150) including audio information. The video document may refer to a document including data of a video. The data of the video may represent the content of the video. The content of the video may include audio information, visual information, or time information. The audio information may include context information and/or sound information of the video document. The context information may indicate semantic contexts of the video. The sound information may include a sound type, a pitch of the sound, a timbre of the sound, or loudness of the sound, or the like, or any combination thereof. The visual information may include image information of the video. Merely by way of example, the image information may include a name of an object in the image, a type of an object in the image, a location of an object in the image, a size of an object in the image, a behavior of an object in the image, an action of an object in the image, or the like, or any combination thereof. In some embodiments, the time information may include the actual time when the video is obtained, a time length of the video, etc.

The video obtaining module 710 may also configured to may divide the video document into a plurality of segments (e.g., a frame, two or more frames) and each segment may correspond to a portion of the time length. Further, the video obtaining module 710 may divide each segment into a corresponding audio segment and a corresponding visual segment. Each audio segment may at least represent a portion of the audio information of the video with respect to each portion of the time length, and each visual segment may at least represent a portion of the visual information of the video with respect to each portion of the time length. In some embodiments, each audio segment of the video document may correspond to a visual segment of the video document. A visual segment corresponding to an audio segment may denote that the visual segment and the corresponding audio segment occur at a same time point or within a same time period in the video document.

The audio processing module 720 may be configured to process the audio information to identify at least one desired audio segment of the audio information that has at least one desired acoustic feature representation. As used herein, a desired acoustic feature representation may refer to a feature representation of an audio that a user of the video editing system 100 desires to retrieve. A desired audio segment may refer to a segment of audio that has the feature representation of an audio that a user of the video editing system 100 desires to retrieve.

In some embodiments, the audio processing module 720 may process the audio information to determine an acoustic feature representation thereof. In some embodiments, the audio processing module 720 may respectively determine an acoustic feature representation of each of the plurality of segments. The acoustic feature representation may represent a feature representation of the context information, a feature representation of the sound information, a feature representation of the time information, or the like, or any combination thereof. In some embodiments, the acoustic feature representation may be in the form of a character, a letter, a digit, a symbol, a code, or the like, or any combination thereof.

The audio processing module 720 may also compare the acoustic feature representation of the segment with a reference file to determine the at least one desired audio segment. Specifically, the audio processing module 720 may determine whether a similarity value of the acoustic feature representation and a reference acoustic feature representation of a reference audio in the reference file is greater than a first predetermined threshold (e.g., 0.8). The audio processing module 720 may determine that the acoustic feature representation matches the reference acoustic feature representation of the reference audio in response to a determination that the similarity value is greater than the first predetermined threshold, and thus the corresponding segment may be designated as one of the at least one desired audio segment.

The video editing module 730 may be configured to edit the video document to generate a video abstraction at least based on the identified at least one desired audio segment of the audio information. In some embodiments, the video editing module 730 may generate the video abstraction by merging the at least one desired audio segment and at least one corresponding desired visual segment. Specifically, the video editing module 730 may determine a corresponding time period when the at least one desired audio segment is generated. The visual segment that is generated simultaneously with the desired audio segment (i.e., generated during the corresponding time period) may be regarded as corresponding to the desired audio segment. In some embodiments, the video editing module 730 may generate the video abstraction by merging at least one desired video segment corresponding to the at least one desired audio segment. The video segment that is generated simultaneously with the desired audio segment (i.e., generated during the corresponding time period) may be regarded as corresponding to the desired audio segment.

In some embodiments, the video editing module 730 may further use the at least one desired acoustic feature representation to label the video abstraction. In some embodiments, the video editing module 730 may label at least a first portion of the desired acoustic feature representation(s) on the video abstraction, e.g., the time when a desired sound corresponding the desired acoustic feature representations starts, the time when the desired sound ends, a time length of the duration of the desired sound on the video abstraction. In some embodiments, the video editing module 730 may set a button corresponding to the start of each of the at least one desired sound A user of the video editing system 100 may quickly review a segment of the video abstraction corresponding to the desired sound by pressing the button. In some embodiments, the video editing module 730 may also display at least a second portion of the at least one desired acoustic feature representation by text beside the video abstraction for reviewing, e.g., the desired sound type (including the reference audio category), the desired context information, the desired timbre, the desired pitch, the desired loudness of the desired sound, etc.

The file generating module 740 may be configured to generate a reference file including a plurality of reference acoustic feature representations of reference audios. Specifically, the file generating module 740 may determine a plurality of reference audio documents. As used herein, the reference document may be a document including data of a reference audio. The data of the reference audio may represent the content of the reference audio. The file generating module 740 may then extract a reference acoustic feature representation of each of the plurality of reference audio documents. As used herein, the reference acoustic feature representation may represent the audio information of the reference audio document. For example, the audio information of the reference audio document may include reference context information of the reference audio document and reference audio information of the reference audio document, and the reference acoustic feature representation may represent a feature representation of the reference context information and a feature representation of the reference audio information. Further, the file generating module 740 may generate a reference file based on the extracted reference acoustic feature representations.

The modules in the processing device 112 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the processing engine 112 may include a storage module (not shown) which may be used to store data generated by the above-mentioned modules.

Figure 8:
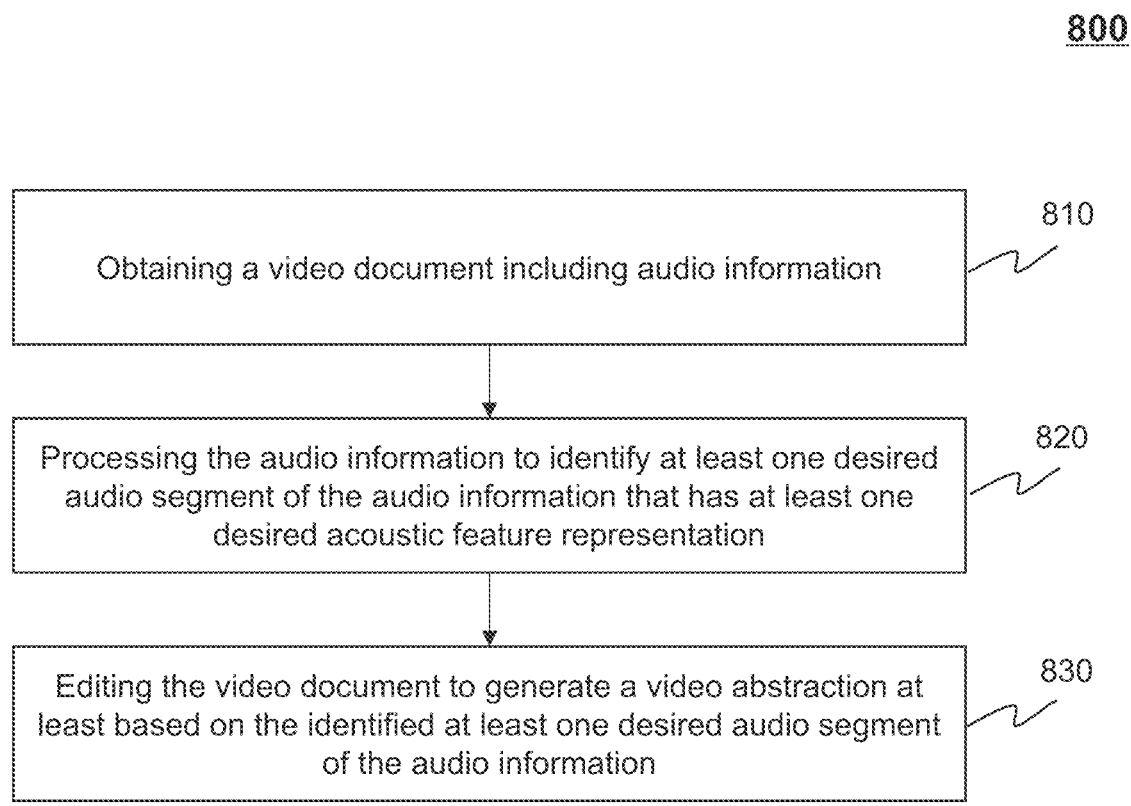
FIG. 8 is a flowchart illustrating an exemplary process for editing a video document to generate a video abstraction according to some embodiments of the present disclosure.

FIG. 8 is a flowchart illustrating an exemplary process for editing a video document to generate a video abstraction according to some embodiments of the present disclosure. In some embodiments, the process 800 may be implemented as a set of instructions (e.g., an application) stored in the storage ROM 230 or RAM 240. The processor 220 and/or the modules in FIG. 7 may execute the set of instructions, and when executing the instructions, the processor 220 and/or the modules in FIG. 7 may be configured to perform the process 800. The operations of the illustrated process presented below are intended to be illustrative. In some embodiments, the process 800 may be accomplished with one or more additional operations not described and/or without one or more of the operations herein discussed. Additionally, the order in which the operations of the process 800 as illustrated in FIG. 8 and described below is not intended to be limiting.

In 810, the video obtaining module 710 may obtain a video document (e.g., the video document 150) including audio information. The video document may refer to a document including data of a video. The data of the video may represent the content of the video. The content of the video may include audio information, visual information, or time information. The audio information may include context information and/or sound information of the video document. The context information may indicate semantic contexts of the video. The sound information may include a sound type, a pitch of the sound, a timbre of the sound, or loudness of the sound, or the like, or any combination thereof. The visual information may include image information of the video. Merely by way of example, the image information may include a name of an object in an image, a type of an object in the image, a location of an object in the image, a size of an object in the image, a behavior of an object in the image, an action of an object in the image, or the like, or any combination thereof. In some embodiments, the time information may include the actual time when the video is obtained, a time length of the video, etc.

In some embodiments, the video document may be generated by encoding the video. The video document may be an elementary stream produced by compressing analog signals (e.g., visual signals) and digital signals via an encoder. Merely by way of example, the encoder may include a Moving Picture Experts Group (MPEG) encoder, an H.261 encoder, an H.263 encoder, an Audio Video coding Standard (AVS) encoder, a Windows Medio Video (WMV) encoder, etc. In some embodiments, the video obtaining module 710 may obtain the video document from the video obtaining device 130 or the storage device 140.

In some embodiments, the video document may last for a specific time length (e.g., 10 minute, 15 minutes, 30 minutes). The video obtaining module 710 may divide the video document into a plurality of segments (e.g., a frame, two or more frames) and each segment may correspond to a portion of the time length. Further, the video obtaining module 710 may divide each segment into a corresponding audio segment and a corresponding visual segment. Each audio segment may at least represent a portion of the audio information of the video with respect to each portion of the time length, and each visual segment may at least represent a portion of the visual information of the video with respect to each portion of the time length. In some embodiments, each audio segment of the video document may correspond to a visual segment of the video document. A visual segment corresponding to an audio segment may denote that the visual segment and the corresponding audio segment occur at a same time point or within a same time period in the video document. For example, the visual segment may have the same sequence number among the plurality of visual segments as the corresponding audio segment among the plurality of audio segments. Both or either of the visual segment and the corresponding audio segment may have a time label indicating the time of occurrence thereof.

In 820, the audio processing module 720 may process the audio information to identify at least one desired audio segment of the audio information that has at least one desired acoustic feature representation. As used herein, a desired acoustic feature representation may refer to a feature representation of an audio that a user of the video editing system 100 desires to retrieve. A desired audio segment may refer to a segment of audio that has the feature representation of an audio that a user of the video editing system 100 desires to retrieve.

In some embodiments, the audio processing module 720 may process the audio information to determine an acoustic feature representation thereof. In some embodiments, the audio processing module 720 may respectively determine an acoustic feature representation of each of the plurality of segments. The acoustic feature representation may represent a feature representation of the context information, a feature representation of the sound information, a feature representation of the time information, or the like, or any combination thereof. In some embodiments, the acoustic feature representation may be in the form of a character, a letter, a digit, a symbol, a code, or the like, or any combination thereof.

In some embodiments, the audio processing module 720 may determine the acoustic feature representations based on a sound recognition algorithm. As descried elsewhere in the present disclosure, the sound recognition algorithm may include a Dynamic Time Warping (DTW) algorithm, a Hidden Markov model, a neural network model, or the like, or any combination thereof.

For each of the plurality of segments, the audio processing module 720 may compare the acoustic feature representation of the segment with a reference file to determine the at least one desired audio segment. Specifically, the audio processing module 720 may determine whether a similarity value of the acoustic feature representation and a reference acoustic feature representation of a reference audio in the reference file is greater than a first predetermined threshold (e.g., 0.8). The audio processing module 720 may determine that the acoustic feature representation matches the reference acoustic feature representation of the reference audio in response to a determination that the similarity value is greater than the first predetermined threshold, and thus the corresponding segment may be designated as one of the at least one desired audio segment.

As described elsewhere in the present disclosure, the acoustic feature representation may represent a feature representation of context information, a feature representation associated with the sound type, a feature representation associated with the pitch of the sound, a feature representation associated with the timbre of the sound, a feature representation associated with the loudness of the sound. Specifically, the audio processing module 720 may determine a first match degree between the feature representation of the context information and a reference feature representation of the reference context information of the reference audio. Similarly, the audio processing module 720 may determine a second match degree between the feature representation associated with the sound type and a reference feature representation associated with a reference sound type, a third match degree between the feature representation associated with the timbre and a reference feature representation associated with a reference timbre, a fourth match degree between the feature representation associated with the pitch and a reference feature representation associated with a reference pitch, a fifth match degree between the feature representation associated with the loudness and a reference feature representation associated with reference loudness. In some embodiments, the audio processing module 720 may determine the match degrees in a predetermined order. For example, the audio processing module 720 may first determine the second match degree, and determine one or more other match degrees only if the second match degree satisfies a certain condition (e.g., the second match degree is larger than a predetermined threshold). Further, the audio processing module 720 may determine the similarity value based on at least one of the match degrees. In some embodiments, the similarity value may be an average of at least one of the match degrees. In some embodiments, the audio processing module may 720 may allocate weights to at least one of the match degrees, and the similarity value may be a weighted sum of the at least one of the match degrees.

In some embodiments, the segment whose acoustic feature representation matches the reference acoustic feature representation of the reference audio may be designated as a target segment. The audio processing module 720 may further determine one or more sequential segments including the target segment. The one or more sequential segments may include at least one segment prior to the target segment, and at least one segment sequent to the target segment. The audio processing module 720 may then determine whether another similarity value of an acoustic feature representation of the one or more sequential segments and the reference acoustic feature representation of the reference audio is greater than a second predetermined threshold. In response to a determination that the another similarity value is greater than the second predetermined threshold, the audio processing module 720 may designate the one or more sequential segments as one of the at least one desired audio segment. In some embodiments, the operation 820 may be performed iteratively until the audio processing module 720 has processed all of the plurality of segments to identify the at least one desired audio segment.

In 830, the video editing module 730 may edit the video document to generate a video abstraction at least based on the identified at least one desired audio segment of the audio information. In some embodiments, the video editing module 730 may generate the video abstraction by merging the at least one desired audio segment and at least one corresponding desired visual segment. Specifically, the video editing module 730 may determine a corresponding time period when the at least one desired audio segment is generated. The visual segment that is generated simultaneously with the desired audio segment (i.e., generated during the corresponding time period) may be regarded as corresponding to the desired audio segment. In some embodiments, the video editing module 730 may generate the video abstraction by merging at least one desired video segment corresponding to the at least one desired audio segment. The video segment that is generated simultaneously with the desired audio segment (i.e., generated during the corresponding time period) may be regarded as corresponding to the desired audio segment.

In some embodiments, the video editing module 730 may further use the at least one desired acoustic feature representation to label the video abstraction. In some embodiments, the video editing module 730 may label at least a first portion of the desired acoustic feature representation(s) on the video abstraction, e.g., the time when a desired sound corresponding the desired acoustic feature representations starts, the time when the desired sound ends, a time length of the duration of the desired sound on the video abstraction. In some embodiments, the video editing module 730 may set a button corresponding to the start of each of the at least one desired sound A user of the video editing system 100 may quickly reviewing a segment of the video abstraction corresponding to the desired sound by pressing the button. In some embodiments, the video editing module 730 may also display at least a second portion of the at least one desired acoustic feature representation by text beside the video abstraction for reviewing, e.g., the desired sound type (including the reference audio category), the desired context information, the desired timbre, the desired pitch, the desired loudness of the desired sound, etc.

In some embodiments, the video editing module 730 may generate the video abstraction further based on the visual information. For example, if a segment of the audio information includes a sound of fire alarm, the video editing module 730 may identify whether the visual information (e.g., one or more visual segments within a time period) corresponding to the segment of the audio includes fire in the images. And the video editing module 730 may generate the video abstraction based on the segment, and the corresponding visual information.

In some embodiments, as descried in FIG. 1 and FIG. 4, video documents may be separately stored in different channels of the multi-channel video obtaining device 130. Additionally or alternatively, the video obtaining device 130 may also classify the video documents based on a predetermined condition. For example, the predetermined condition may be that videos with the same sound type may be stored together. As another example, the predetermined condition may be that videos with the same context information may be stored together. Accordingly, the video editing module 730 may store the video documents and/or corresponding video abstractions based on the channels and/or the classification.

After the video abstraction is generated, once a user (e.g., a video monitoring personnel) of the video editing system 100 or a third party desires to know the content of the video, the user can only review the video abstraction.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the division of the video document may be performed after the extraction of the acoustic feature representation of the video document.

Figure 9:
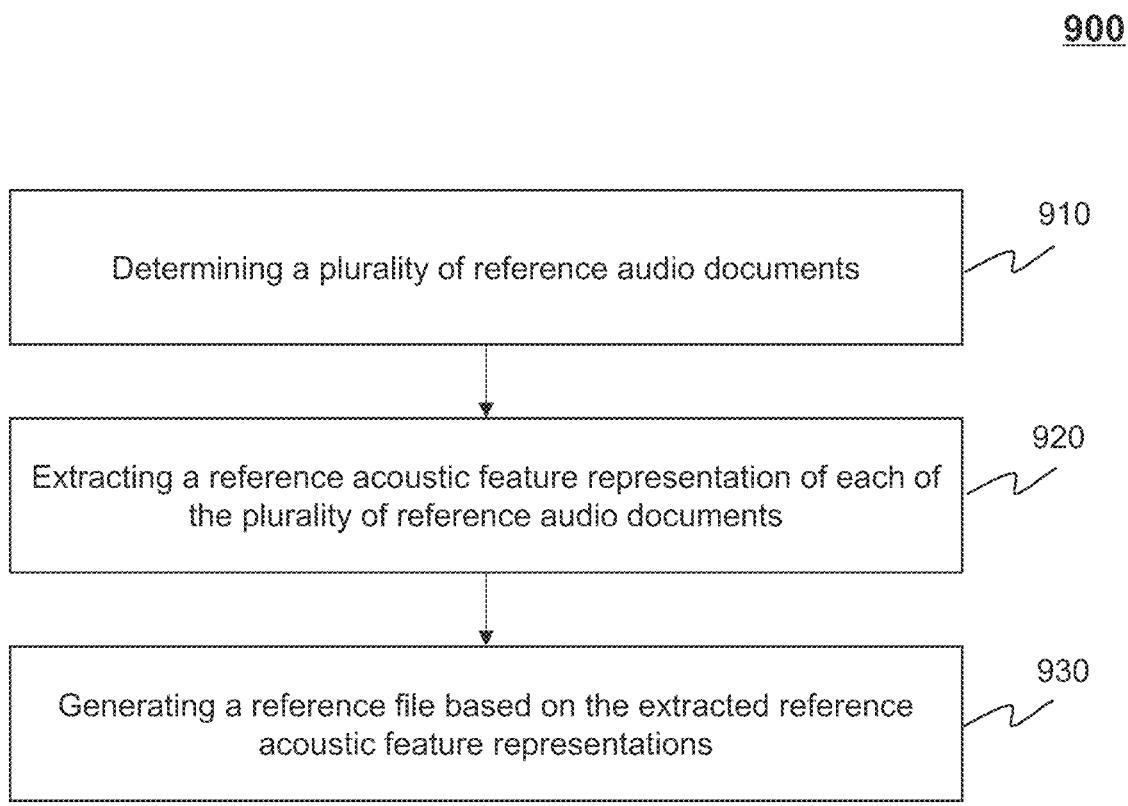
FIG. 9 is a flowchart illustrating an exemplary process for generating a reference file including different reference audio information according to some embodiments of the present disclosure.

FIG. 9 is a flowchart illustrating an exemplary process for generating a reference file including different reference audio information according to some embodiments of the present disclosure. In some embodiments, the process 900 may be implemented as a set of instructions (e.g., an application) stored in the storage ROM 230 or RAM 240. The processor 220 and/or the modules in FIG. 7 may execute the set of instructions, and when executing the instructions, the processor 220 and/or the modules in FIG. 7 may be configured to perform the process 900. The operations of the illustrated process presented below are intended to be illustrative. In some embodiments, the process 900 may be accomplished with one or more additional operations not described and/or without one or more of the operations herein discussed. Additionally, the order in which the operations of the process 900 as illustrated in FIG. 9 and described below is not intended to be limiting.

In 910, the file generating module 740 may determine a plurality of reference audio documents. As used herein, the reference document may be a document including data of a reference audio. The data of the reference audio may represent the content of the reference audio. The content of the reference audio may include audio information of the reference audio. The audio information in the plurality of reference audio documents may include entire information of audios that a user of the video editing system 100 desire to retrieve. As used herein, the entire information may contain all types of acoustic feature representations of audio information that the user desires to retrieve. In some embodiments, the file generating module 740 may determine the reference audio documents by decoding the reference audios into a Pulse Code Modulation (PCM) mode. In some embodiments, the file generating module 740 may obtain the reference audio documents or the reference audios from the video obtaining device 130 or the storage device 140.

In 920, the file generating module 740 may extract a reference acoustic feature representation of each of the plurality of reference audio documents. As used herein, the reference acoustic feature representation may represent the audio information of the reference audio document. Similar to the audio information of the video document described elsewhere in the present disclosure, the audio information of the reference audio document may include reference context information of the reference audio document and reference audio information of the reference audio document, and the reference acoustic feature representation may represent a feature representation of the reference context information and a feature representation of the reference audio information. The reference context information may indicate the semantic context of the audio information. The reference audio information may include a sound type, a pitch of the sound, a timbre of the sound, loudness of the sound, or the like, or any combination thereof. In some embodiments, the reference acoustic feature representation may be in the form of a character, a letter, a digit, a symbol, a code, or the like, or any combination thereof.

In some embodiments, the file generating module 740 may extract the reference acoustic feature representation based on a sound recognition algorithm. An exemplary sound recognition algorithm may include a Dynamic Time Warping (DTW) algorithm, a Hidden Markov model, a neural network model, or the like, or any combination thereof.

In 930, the file generating module 740 may generate a reference file based on the extracted reference acoustic feature representations corresponding to the reference audio information. In some embodiments, the file generating module 740 may label each of the plurality of reference audio documents based on the corresponding reference acoustic feature representation. In some embodiments, the file generate module 740 may label the time when a reference audio corresponding to the reference audio information starts, the time when the reference audio ends, a time length of the duration of the reference audio, the reference sound type (including the reference audio category), the reference context information, the reference timbre, the reference pitch, the reference loudness of the reference audio, or the link, on the reference audio. Additionally or alternatively, the filing generating module 740 may generate a text including the labelled information described above. The text may be also in the form of a table, a list, a visual interface, etc. Further, the file generating module 740 may generate the reference file including the plurality of labelled reference audio documents. In some embodiments, the file generating module 740 may classify the plurality of reference audio documents and generate one or more sub-files based on, e.g., the reference context information and/or the reference audio information. In some embodiments, the file generating module 740 may classify the reference audio documents having the same sound type in a sub-file. For example, the file generating module 740 may classify the reference audio documents including sounds of screams into a first sub-file, and classify the reference audio documents including sounds of alarms into a second sub-file. In some embodiments, the file generating module 740 may classify the reference audio documents having the same context information in a sub-file. For example, the file generating module 740 may classify the reference audio documents of which context information includes "on fire" into a first sub-file. As another example, the file generating module 740 may classify the reference audio documents of which context information includes "exploding" into a second sub-file.

In some embodiments, the file generating module 740 may determine a prediction model based on the reference file. As used herein, the prediction model may be configured to predict a similarity value between an acoustic feature representation of an input audio and a reference acoustic feature representation of a reference audio. Specifically, the file generating module 740 may train a preliminary model to generate the prediction model by using the reference acoustic feature representations and the reference audios in the reference file. Merely by way of example, the preliminary model may include a Gaussian Mixture Model-Hidden Markov Model (GMM-HMM), a Deep Neural Network-Hidden Markov Model (DNN-HMM), a Recurrent Neural Network-Hidden Markov Model (RNN-HMM), a Convolutional Neural Network-Hidden Markov Model (CNN-HMM), etc.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

I claim:

1. A system for editing a video, comprising:
at least one storage medium including a set of instructions; and at least one processor in communication with the at least one storage medium, wherein when executing the set of instructions, the at least one processor is directed to:
obtain a video document including audio information;
divide the video document into a plurality of audio segments based on the audio information;
for each of the audio segments:
extract a first acoustic feature representation corresponding to the audio segment;
compare the first acoustic feature representation with a reference acoustic feature representation of a reference audio; and
when the first acoustic feature representation matches the reference acoustic feature representation, determine a combination of one or more sequential audio segments including the audio segment from the plurality of audio segments;
extract a second acoustic feature representation corresponding to the combination of the one or more sequential audio segments;
compare the second acoustic feature representation with the reference acoustic feature representation of the reference audio; and
designate the combination of the one or more sequential audio segments as a desired audio segment of the audio information that has a desired acoustic feature representation when the second acoustic feature representation matches the reference acoustic feature representation; and
edit the video document to generate a video abstraction based on at least one desired audio segment of the audio information;
wherein the audio information includes context information indicating semantic context of the audio information of the video document and sound information including at least one of: a sound type of the sound information, a pitch of the sound information, a timbre of the sound information, or loudness of the sound information of the video document.

2. The system of claim 1, wherein the reference acoustic feature representation represents at least one of a first acoustic feature representation associated with a type of reference context information or a second acoustic feature representation associated with a reference sound type.

3. The system of claim 2, wherein the reference acoustic feature representation of the reference audio is selected from a reference file, and the reference file is determined by a process, the process comprising:
determining a plurality of reference audio documents including a plurality of types of reference context information and a plurality of reference sound types;
extracting a reference acoustic feature representation of each of the plurality of reference audio documents; and
generating the reference file based on the extracted reference acoustic feature representations.

4. The system of claim 3, wherein the generating the reference file based on the extracted reference acoustic feature representations includes:
labelling each of the plurality of reference audio documents based on the reference acoustic feature representations; and
generating the reference file including the plurality of labelled reference audio documents.

5. The system of claim 4, further comprising:
dividing the reference file into one or more sub-files based on the plurality of types of reference context information or the plurality of reference sound types.

6. The system of claim 1, wherein to designate the combination of the one or more sequential audio segments as a desired audio segment of the audio information that has a desired acoustic feature representation if the second acoustic feature representation matches the reference acoustic feature representation, the at least one processor is directed to:
determine a similarity value between the second acoustic feature representation and the reference acoustic feature representation of the reference audio; and
designate the combination of the one or more sequential audio segments as the desired audio segment in response to a determination that the similarity value between the second acoustic feature representation and the reference acoustic feature representation is greater than a predetermined value.

7. The system of claim 1, wherein to edit the video document to generate a video abstraction based on at least one desired audio segment of the audio information, the at least one processor is directed to:
identify one or more portions of the video document corresponding to the at least one desired audio segment respectively; and
merge the one or more portions of the video document to generate the video abstraction.

8. The system of claim 7, wherein the at least one processor is further directed to:
use the at least one desired acoustic feature representation to label the video abstraction.

9. The system of claim 1, wherein the video document further includes visual information, and the at least one processor is further directed to:
determine the video abstraction based on the at least one desired audio segment of the audio information and the visual information.

10. The system of claim 1, wherein the at least one processor is further directed to:
use a prediction model to predict a similarity value between an acoustic feature representation of an input audio and the reference acoustic feature representation of the reference audio.

11. A method implemented on a computing device having at least one processor, at least one storage medium, and a communication platform connected to a network, the method comprising:
obtaining a video document including audio information;
dividing the video document into a plurality of audio segments based on the audio information;
for each of the audio segment:
extracting a first acoustic feature representation corresponding to the audio segment;
comparing the first acoustic feature representation with a reference acoustic feature representation of a reference audio; and
when the first acoustic feature representation matches the reference acoustic feature representation, determining a combination of one or more sequential audio segments including the audio segment from the plurality of audio segments;
extracting a second acoustic feature representation corresponding to the combination of the one or more sequential audio segments;
comparing the second acoustic feature representation with the reference acoustic feature representation of the reference audio; and
designating the combination of the one or more sequential audio segments as a desired audio segment of the audio information that has a desired acoustic feature representation when the second acoustic feature representation matches the reference acoustic feature representation; and
editing the video document to generate a video abstraction at least based on the identified at least one desired audio segment of the audio information;
wherein the audio information includes context information indicating semantic context of the audio information of the video document and sound information including at least one of: a sound type of the sound information, a pitch of the sound information, a timbre of the sound information, or loudness of the sound information of the video document.

12. The method of claim 11, wherein the editing the video document to generate a video abstraction based on at least one desired audio segment of the audio information includes:
identifying one or more portions of the video document corresponding to the at least one desired audio segment respectively; and
merging the one or more portions of the video document to generate the video abstraction.

13. A non-transitory computer readable medium, comprising executable instructions that, when executed by at least one processor, directs the at least one processor to perform a method, the method comprising:
obtaining a video document including audio information;
dividing the video document into a plurality of audio segments based on the audio information;
for each of the audio segments:
extracting a first acoustic feature representation corresponding to the audio segment;
comparing the first acoustic feature representation with a reference acoustic feature representation of a reference audio; and
when the first acoustic feature representation matches the reference acoustic feature representation, determining a combination of one or more sequential audio segments including the audio segment from the plurality of audio segments;
extracting a second acoustic feature representation corresponding to the combination of the one or more sequential audio segments;
comparing the second acoustic feature representation with the reference acoustic feature representation of the reference audio; and
designating the combination of the one or more sequential audio segments as a desired audio segment of the audio information that has a desired acoustic feature representation when the second acoustic feature representation matches the reference acoustic feature representation; and
editing the video document to generate a video abstraction at least based on the identified at least one desired audio segment of the audio information;
wherein the audio information includes context information indicating semantic context of the audio information of the video document and sound information including at least one of: a sound type of the sound information, a pitch of the sound information, a timbre of the sound information, or loudness of the sound information of the video document.

14. The system of claim 6, wherein to determine a similarity value between the second acoustic feature representation and the reference acoustic feature representation of the reference audio, the at least one processor is directed to:
   determine a first match degree between a feature representation of context information of the combination of the one or more sequential audio segments and a reference feature representation of reference context information of the reference audio;
   determine a second match degree between a feature representation associated with a sound type of the combination of the one or more sequential audio segments and a reference feature representation associated with a reference sound type of the reference audio;
   determine a third match degree between a feature representation associated with a timbre of the combination of the one or more sequential audio segments and a reference feature representation associated with a reference timbre of the reference audio;
   determine a fourth match degree between a feature representation associated with a pitch of the combination of the one or more sequential audio segments and a reference feature representation associated with a reference pitch of the reference audio; and
   determine a fifth match degree between a feature representation associated with loudness of the one or more sequential audio segments and a reference feature representation associated with reference loudness of the reference audio;
   determine the similarity value based on at least one of the first match degree, the second match degree, the third match degree, the fourth match degree, or the fifth match degree.

* * * * *